United States Patent [19]

Emoto et al.

[11] Patent Number: 4,687,721
[45] Date of Patent: Aug. 18, 1987

[54] ELECTROPHOTOGRAPHIC PHOTORECEPTOR CONTAINING A TRISAZO COMPOUND

[75] Inventors: Kazuhiro Emoto; Akira Itoh; Kozo Haino, all of Nagaokakyo, Japan

[73] Assignee: Mitsubishi Paper Mills, Ltd., Tokyo, Japan

[21] Appl. No.: 905,450

[22] Filed: Sep. 10, 1986

[30] Foreign Application Priority Data

Dec. 13, 1985 [JP] Japan .................... 60-280425

[51] Int. Cl.[4] .................... G03G 5/06; G03G 5/14
[52] U.S. Cl. .................... 430/58; 430/79
[58] Field of Search .................... 430/58, 73, 74, 79

[56] References Cited

U.S. PATENT DOCUMENTS

| | | | |
|---|---|---|---|
| 4,427,753 | 1/1984 | Fujimura et al. | 430/74 |
| 4,433,039 | 2/1984 | Miyakawa et al. | 430/58 |
| 4,439,506 | 3/1984 | Ohta et al. | 430/58 |
| 4,507,471 | 3/1985 | Ohta | 430/58 |
| 4,562,131 | 12/1985 | Sasaki et al. | 430/58 |
| 4,567,124 | 1/1986 | Ohta et al. | 430/59 |
| 4,600,674 | 7/1986 | Emoto et al. | 430/72 |
| 4,619,881 | 10/1986 | Makino et al. | 430/79 |

*Primary Examiner*—John L. Goodrow
*Attorney, Agent, or Firm*—Cushman, Darby & Cushman

[57] ABSTRACT

There is disclosed an electrophotographic photoreceptor comprising an electroconductive support and, provided thereon, a photosensitive layer containing (A) a trisazo pigment formed by the reaction between a coupler component represented by the following general formula (I) and a diazonium salt represented by the following general formula (II) or (B) a bisazo pigment represented by the following general formula (III):

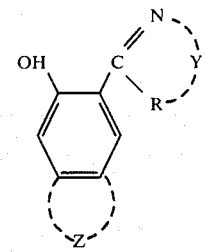

(I)

wherein Z is a substituted or unsubstituted hydrocarbon ring or a group of atoms necessary to complete a substituted or unsubstituted hetero ring, R is oxygen, sulfur, or —NR'—, Y is a chain hydrocarbon necessary to complete a 5- or 6-membered ring, and R' is hydrogen or an alkyl, benzyl, or aryl group which may have a substituent;

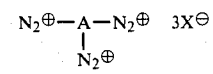

(II)

wherein A is a trivalent moiety whose carbon atom is bonded to nitrogen atom forming azo group and $X^{\ominus}$ is an anionic functional group;

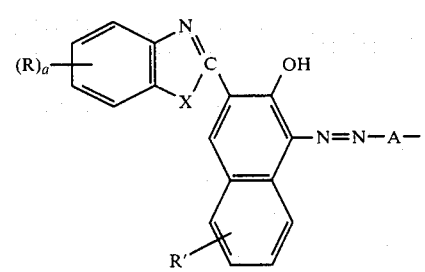

(III)

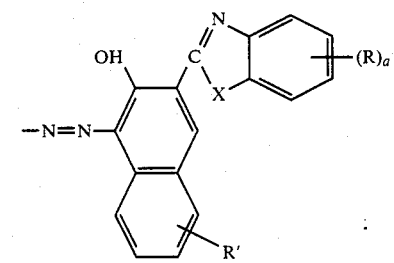

wherein A is a divalent moiety whose carbon atom is bonded to nitrogen atom forming azo group, R's which may be the same or different are each hydrogen, methyl, ethyl, nitro, or halogen, R' is hydrogen or halogen, X is —O—, —S—, or —NH—, and a is an integer of 1 or 2.

15 Claims, No Drawings

ELECTROPHOTOGRAPHIC PHOTORECEPTOR CONTAINING A TRISAZO COMPOUND

BACKGROUND OF THE INVENTION

This invention relates, in general, to an electrophotographic photoreceptor and, in particular, a novel electrophotographic photoreceptor having a photosensitive layer containing an azo pigment. More specifically, it relates to an electrophotographic photoreceptor having a high sensitivity and a high durability suitable for repetitive use.

As for conventional electrophotographic photoreceptors, there have been widely known those having a photosensitive layer containing as principal constituent inorganic photoconductive materials such as selenium, zinc oxide, cadmium sulfide, and the like. Such photoreceptors, however, are not always satisfactory with respect to sensitivity, thermal stability, moisture resistance, or durability. Particularly, selenium and cadmium sulfide are produced or handled under restricted conditions because of their toxicity.

In recent years, electrophotographic photoreceptors having a photosensitive layer containing as principal constituent organic photoconductive compounds are attracting a wide interest on account of the advantages such as relatively easier production, lower cost, easier handling and superior thermal stability as compared with selenium photoreceptor. Poly-N-vinylcarbazole is a well known organic photoconductor. An electrophotographic photoreceptor having a sensitive layer containing as major constituent a charge transfer complex formed from poly-N-vinylcarbazole and a Lewis acid such as 2,4,7-trinitro-9-fluorenone is not satisfactory in sensitivity and durability.

A separated function photoreceptor of the superimposed type or dispersion type, in which the charge carrier generation function and the charge carrier transport function are assigned to different substances, has advantages in that the materials can be chosen from a large variety and it is possible to obtain comparatively easily a photoreceptor having desired properties with respect to charge characteristics, sensitivity, and durability.

Various charge carrier generation substances and charge carrier transport substances have been proposed. There is an electrophotographic photoreceptor in actual use, which has a combination of a charge carrier generation layer (CGL) comprising amorphous selenium and a charge carrier transport layer (CTL) comprising poly-N-vinylcarbazole as major constituent. The CGL comprising amorphous selenium, however, has a disadvantage of insufficient durability.

There are also proposed to use various organic dyes and pigments as charge carrier generation substance. For instance, electrophotographic photoreceptors which contain monoazo or bisazo pigments in the sensitive layer are disclosed in Japanese Patent Publication Nos. 30,513/73 and 11,945/81; Japanese Patent Application "Kokai" (Laid-open) Nos. 4,241/77 and 46,558/79. Such azo pigments, however, are not always satisfactory in sensitivity, residual potential, or stability in repetitive use. Moreover, their spectral wavelengths regions do not cover the near infrared region, leading to restricted freedom in the selection of light source. The fact is that there has been obtained no photoreceptor which sufficiently meet the broad range of requirements for electrophotographic processes.

SUMMARY OF THE INVENTION

An object of this invention is to provide an electrophotographic photoreceptor containing an azo pigment, which is stable against heat and light and is excellent in the ability of charge carrier generation.

Another object of this invention is to provide an electrophotographic photoreceptor exhibiting a high sensitivity, a low residual potential, and an excellent durability sufficient for repetitive use without deterioration in the characteristics.

A further object of the invention is to provide an electrophotographic photoreceptor having a high sensitivity to a broad range of light sources including semiconductor laser.

DESCRIPTION OF THE INVENTION

The present inventors carried out an extensive study to achieve the above objects and, as a result, discovered that (A) a trisazo pigment formed by the reaction between a coupler component represented by the following general formula (I) and a diazonium salt represented by the following general formula (II) or (B) a bisazo pigment represented by the general formula (III) can act as an effective constituent of a photoreceptor:

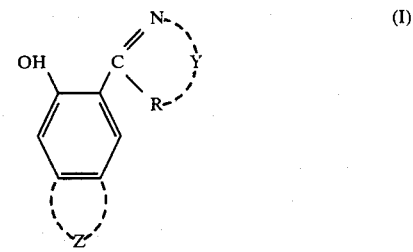

wherein

Z: a substituted or unsubstituted hydrocarbon ring or a group of atoms necessary for completing a substituted or unsubstituted hetero ring, R: oxygen atom, sulfur atom, or —NR′—, Y: a chain hydrocarbon necessary for completing a 5- or 6-membered ring, R′: hydrogen atom or an alkyl, benzyl, or aryl group which may have a substituent;

wherein

A: a trivalent moiety whose carbon atom is bonded to nitrogen atoms forming azo groups, $X^{\ominus}$: an anionic functional group;

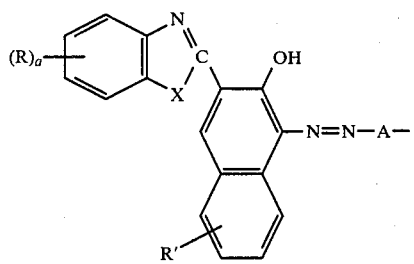

(III)

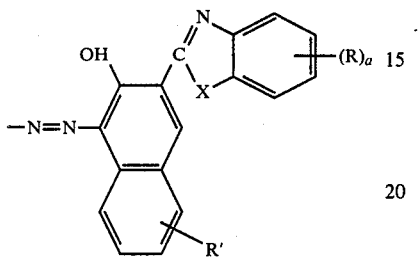

wherein
- A: a divalent moiety whose carbon atom is bonded to nitrogen atoms forming azo groups,
- R: (which may be the same of different) hydrogen, methyl, ethyl, nitro, or halogen,
- R': hydrogen or halogen,
- X: —O—, —S—, or —NH—,
- a: an integer of 1 or 2.

According to this invention, an electrophotographic photoreceptor is prepared by using as photoconductor, which forms the sensitive layer of the photoreceptor, the trisazo pigment formed by the reaction of the coupler component and the diazonium salt component represented by the general formulas (I) and (II), respectively, or the bisazo pigment represented by the general formulas (III) and by utilizing said azo compound having an excellent charge carrier generating ability as the charge carrier generating substance in a photoreceptor of the separated function type, in which the charge carrier generation and the charge carrier transport are assigned to different substances. The resulting photoreceptor is excellent in film properties, charge retention, sensitivity, and residual potential, exhibits little deterioration due to the fatigue in repeated use, and resists to heat or light without undergoing any change in the characteristics. The coupler component represented by the general formula (I) is preferably a coupler represented by the following structural formula (I') or (I'')

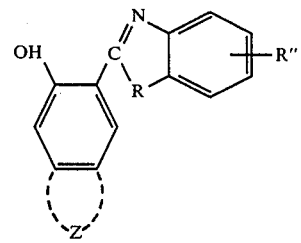

(I')

wherein R'' is hydrogen, alkyl, nitro, alkoxy, halogen, or cyano and Z and R are the same as in general formula (I) or

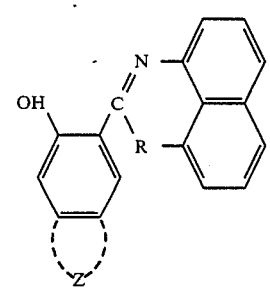

(I'')

wherein Z and R are the same as in general formula (I).

As examples of individual trisazo pigments, mention may be made of the following, but the invention is not limited thereto.

Examples of trisazo pigments:

| Azo pigment No. | Coupler component | Diazonium salt component |
|---|---|---|
| 1 | (naphthol-benzoxazole structure with OH and methyl) | (triphenylamine with three $N_2^\oplus$ groups, $3Cl^\ominus$) |
| 2 | (naphthol-benzothiazole structure with OH and methyl) | " |

-continued
Examples of trisazo pigments:
| Azo pigment No. | Coupler component | Diazonium salt component |
|---|---|---|
| 3 | 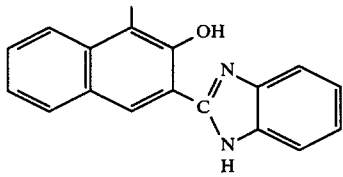 | ″ |
| 4 | 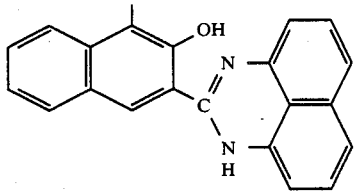 | ″ |
| 5 | 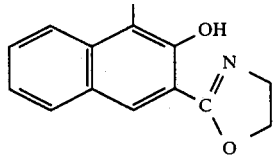 | ″ |
| 6 | 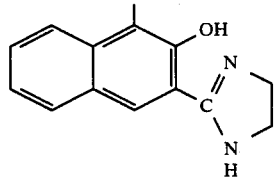 | ″ |
| 7 | 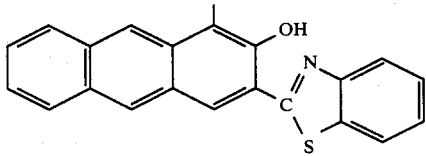 | ″ |
| 8 | 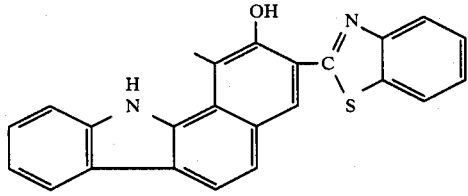 | ″ |
| 9 | 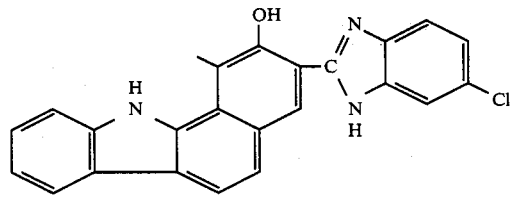 | ″ |

-continued
Examples of trisazo pigments:

| Azo pigment No. | Coupler component | Diazonium salt component |
|---|---|---|
| 10 | [structure: carbazole-methyl-OH-benzothiazole with OCH₃] | " |
| 11 | The same as in No. 1 | [structure: tris-diazonium with CH₂ bridge, 3Cl⊖] |
| 12 | The same as in No. 2 | " |
| 13 | The same as in No. 4 | " |
| 14 | The same as in No. 8 | " |
| 15 | [structure: anthracene-methyl-OH-N-methylbenzimidazole] | [structure: fluorene-type with CH= and N₂⊕ groups, 3Cl⊖] |
| 16 | [structure: dibenzofuran-methyl-OH-benzothiazole] | " |
| 17 | The same as in No. 2 | [structure: stilbene-type N₂⊕—C₆H₄—CH=CH—C₆H₄—N(C₆H₄—N₂⊕)₂, 3Cl⊖] |
| 18 | The same as in No. 8 | " |
| 19 | [structure: naphthalene-methyl-OH with tetrahydro-diazepine NH] | " |
| 20 | The same as in No. 3 | [structure: N₂⊕—C₆H₄—C(CN)=CH—C₆H₄—N(C₆H₄—N₂⊕)₂, 3Cl⊖] |

-continued

Examples of trisazo pigments:

| Azo pigment No. | Coupler component | Diazonium salt component |
|---|---|---|
| 21 | The same as in No. 16 | " |
| 22 | The same as in No. 4 | [structure: N₂⊕-C₆H₄-C(CN)=CH-C₆H₄-N(C₆H₄-N₂⊕)₂ · 3BF₄⊖] |
| 23 | The same as in No. 7 | " |
| 24 | The same as in No. 9 | " |
| 25 | [structure: anthracene-naphthol with dihydroimidazole substituent, OH, CH₃] | [structure: (N₂⊕-C₆H₄)₂C=C(CN)(C₆H₄-N₂⊕) · 3Cl⊖] |
| 26 | The same as in No. 2 | [structure: N₂⊕-C₆H₄-C(Cl)=CH-C₆H₄-N(C₆H₄-N₂⊕)₂ · 3Cl⊖] |
| 27 | The same as in No. 16 | " |
| 28 | [structure: carbazole-fused naphthol with benzoxazole-Cl substituent, OH, CH₃] | " |
| 29 | [structure: naphthol with perimidine-OCH₃ substituent, OH, CH₃] | " |
| 30 | The same as in No. 7 | [structure: benzoxazole with two (N₂⊕-C₆H₄) groups on methylene, · 3Cl⊖] |

-continued
Examples of trisazo pigments:
| Azo pigment No. | Coupler component | Diazonium salt component |
|---|---|---|
| 31 | The same as in No. 8 | " |
| 32 | The same as in No. 9 | " |
| 33 | The same as in No. 28 | " |
| 34 | The same as in No. 1 | 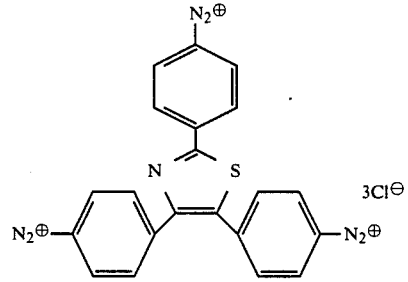 |
| 35 | The same as in No. 5 | " |
| 36 | The same as in No. 2 | 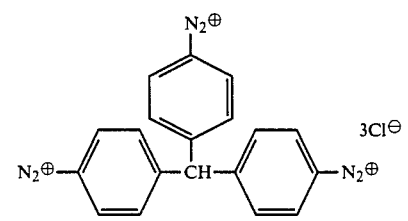 |
| 37 | The same as in No. 8 | " |
| 38 | The same as in No. 28 | " |
| 39 | The same as in No. 1 | 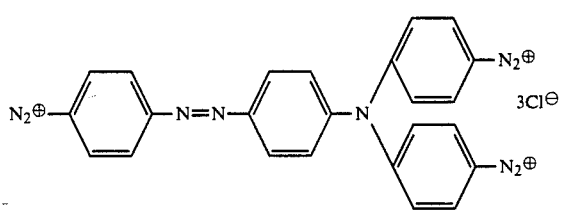 |
| 40 | The same as in No. 7 | " |
| 41 | The same as in No. 19 | " |
| 42 | The same as in No. 3 | 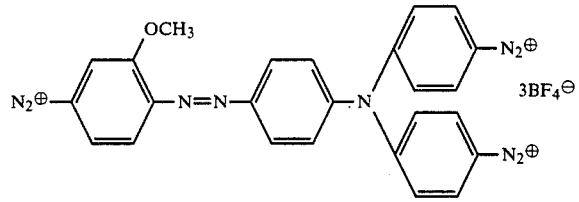 |
| 43 | The same as in No. 2 | 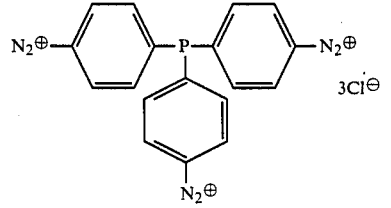 |
| 44 | The same as in No. 15 | " |

-continued

Examples of trisazo pigments:

| Azo pigment No. | Coupler component | Diazonium salt component |
|---|---|---|
| 45 | The same as in No. 8 | 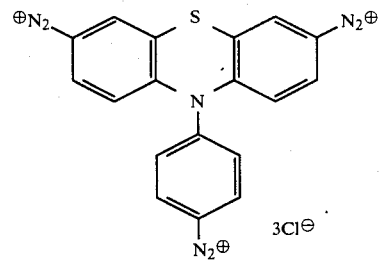 |
| 46 | The same as in No. 28 | " |

The trisazo pigment used in this invention can be easily synthesized by converting a trivalent amino compound represented by the general formula

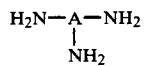

(wherein A is as defined above) into an azo compound in a customary manner and coupling the resulting azo compound with a coupler represented by the general formula (wherein Z, R and Y are as defined above) in the presence of an alkali; or by diazotizing the above trivalent amino compound, isolating the resulting diazonium salt in the form of borofluoride or zinc chloride double salt, and coupling the isolated salt with a coupler in the presence of an organic or inorganic alkaline reagent in a suitable solvent such as, for example, N,N-dimethylformamide, dimethyl sulfoxide, ethanol, or dioxane.

The bisazo pigments preferably used in this invention are those represented by the following general formulas, though other bisazo pigments can also be used.

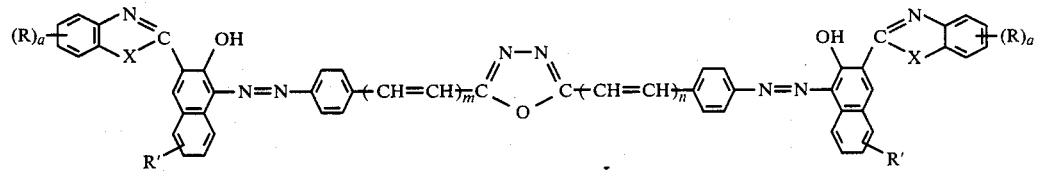

wherein m and n are 0 or 1 and X, R, R' and a are the same as in general formula (III).

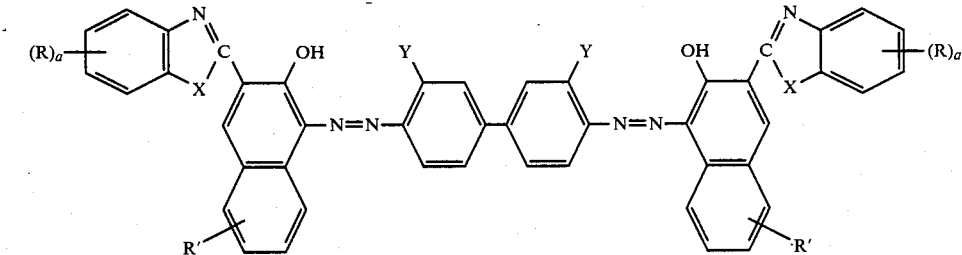

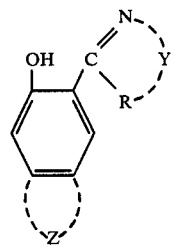

wherein Y is hydrogen, halogen, nitro, lower alkoxy, or lower alkyl and X, R, R' and a are the same as in general formula (III).

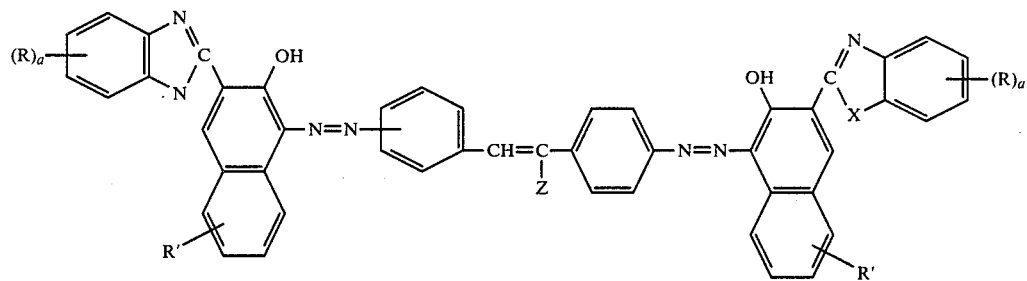

wherein Z is hydrogen, halogen or cyano and X, R, R' and a are the same as in general formula (III).

wherein $R_1$ is hydrogen, alkyl, allyl, propenyl, benzyl which may have a substituent, or phenyl which may

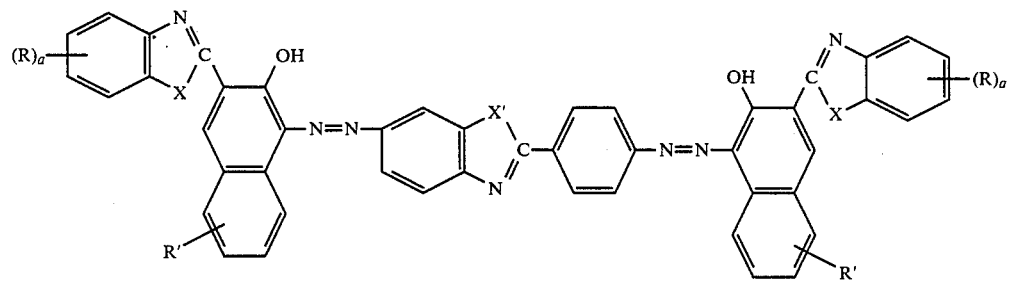

wherein X' is —O—, —S— or —NH— and X, R, R' and a are the same as in general formula (III).

have a substituent and X, R, R' and a are the same as in general formula (III).

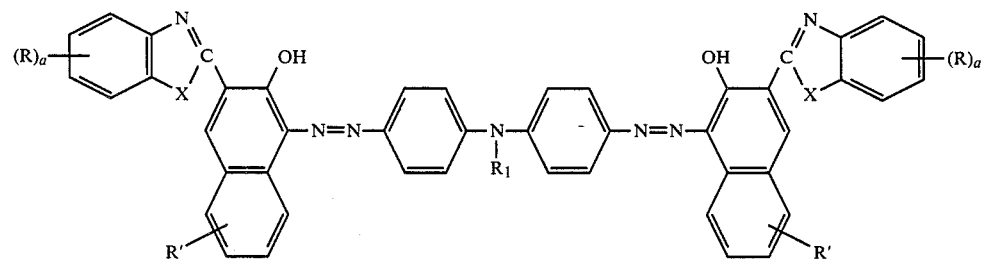

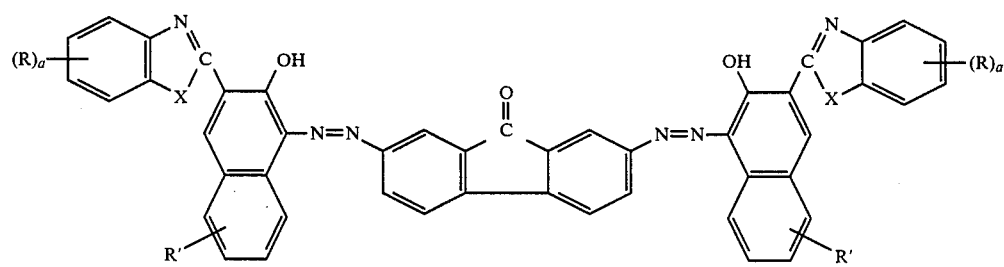

wherein X, R, R' and a are the same as in general formula (III).

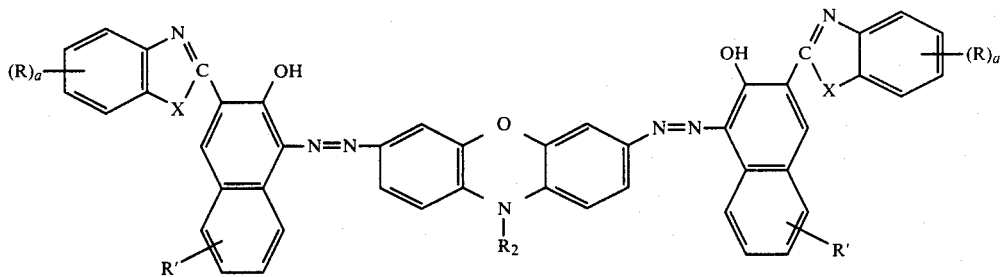

wherein $R_2$ is hydrogen, alkyl, allyl, propargyl, or benzyl which may have a substituent, and X, R, R' and a are the same as in general formula (III).

wherein $R_4$ and $R_5$ are each hydrogen, halogen, alkyl, methoxy or nitro, and X, R, R' and a are the same as in general formula (III).

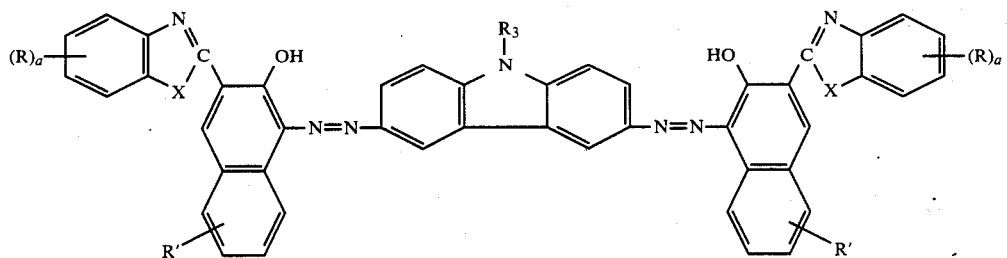

wherein $R_3$ is hydrogen, alkyl, allyl, propargyl, or benzyl which may have a substituent.

Examples of bisazo pigments used in this invention are those having the following structural formulas, but

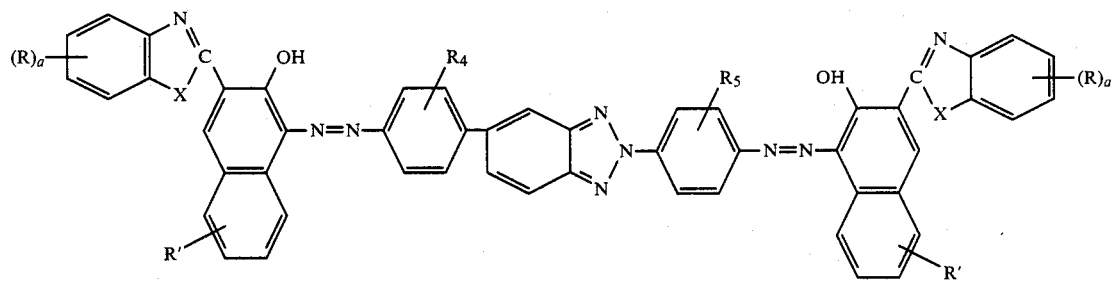

other bisazo pigments can also be used.

No. (1)

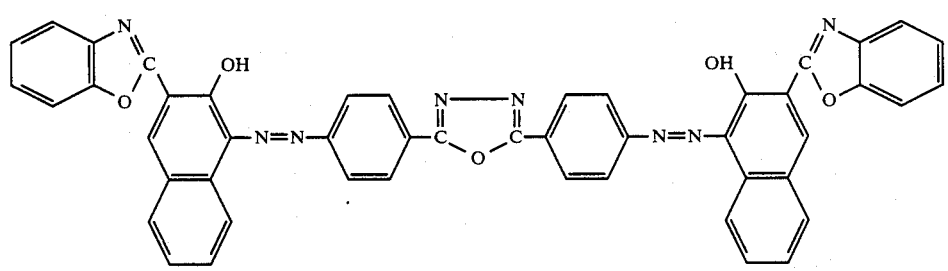

(2)

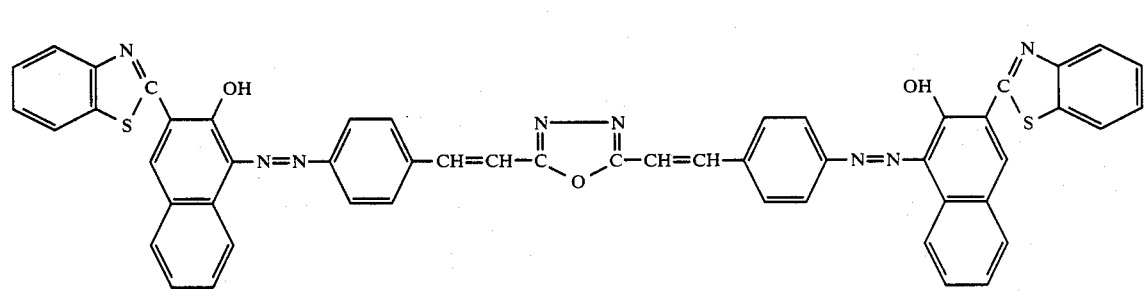

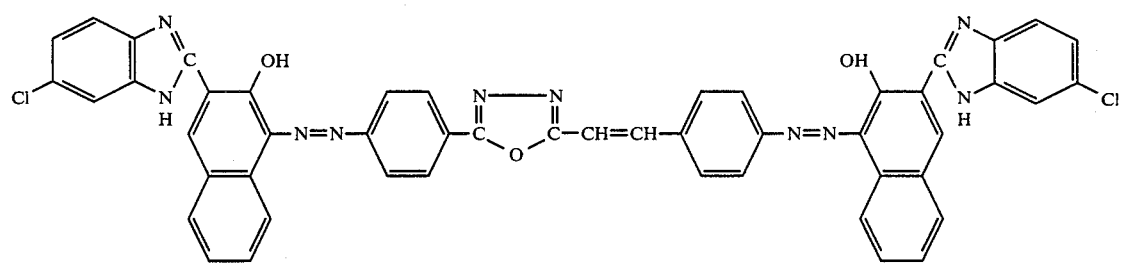
(3)
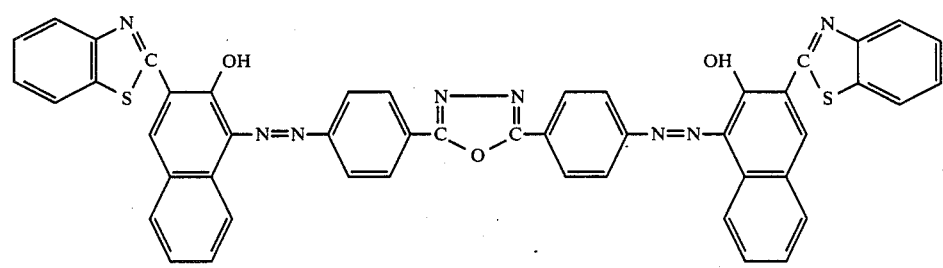
(4)
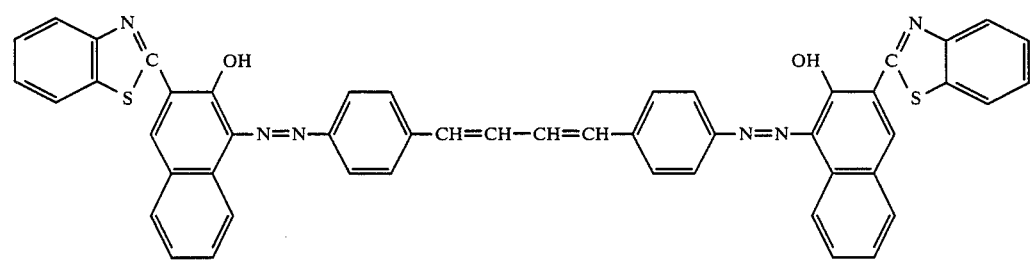
(5)
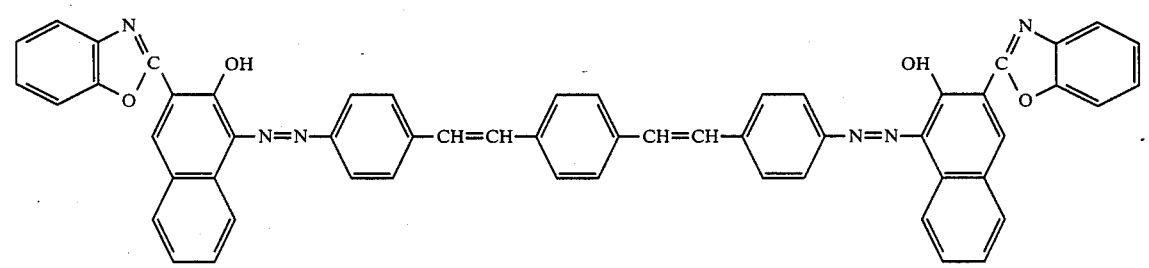
(6)
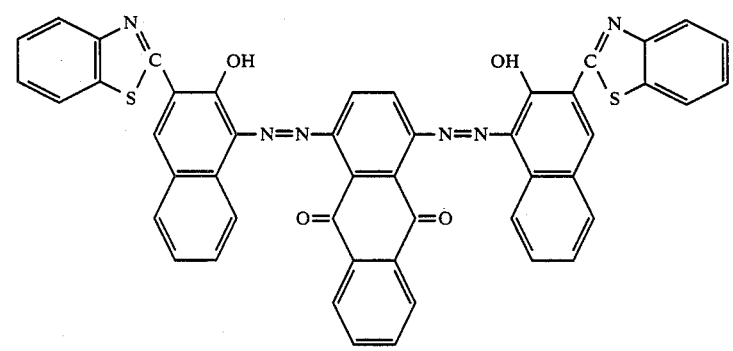
(7)

-continued
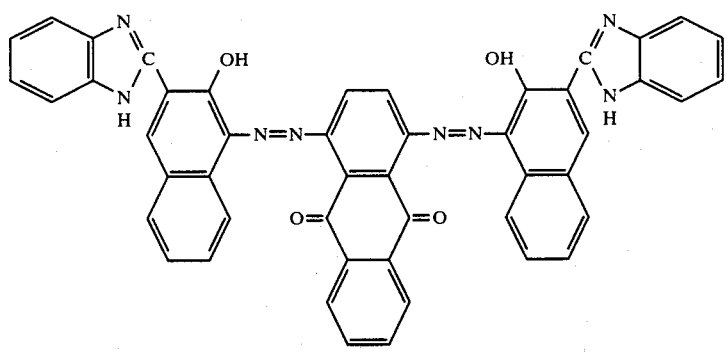
(8)
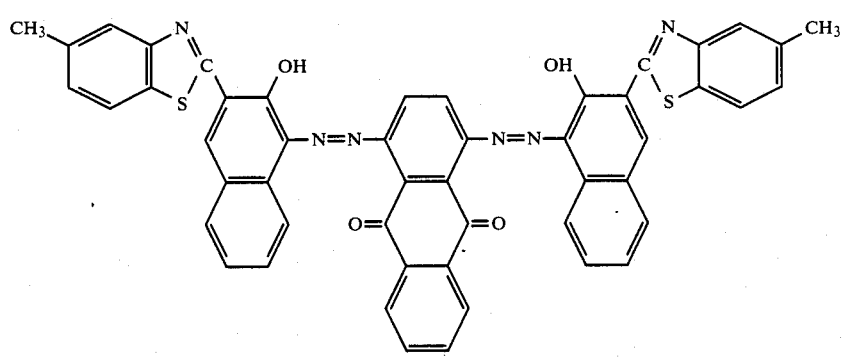
(9)
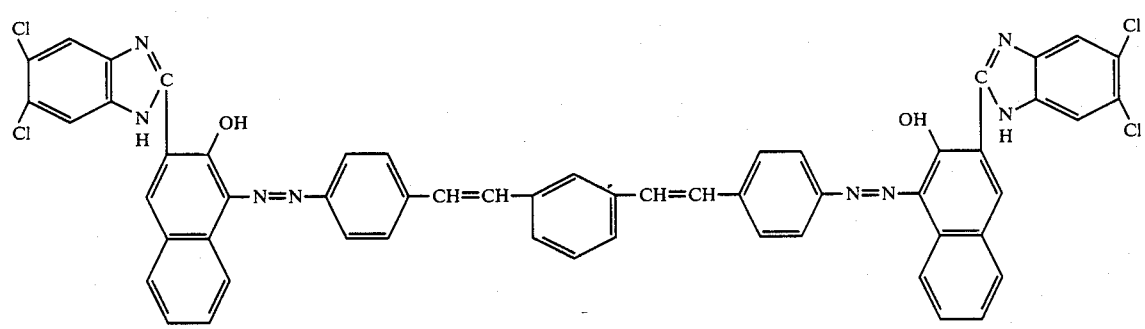
(10)
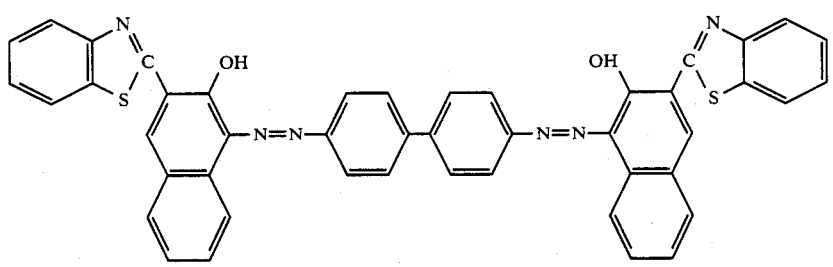
(11)
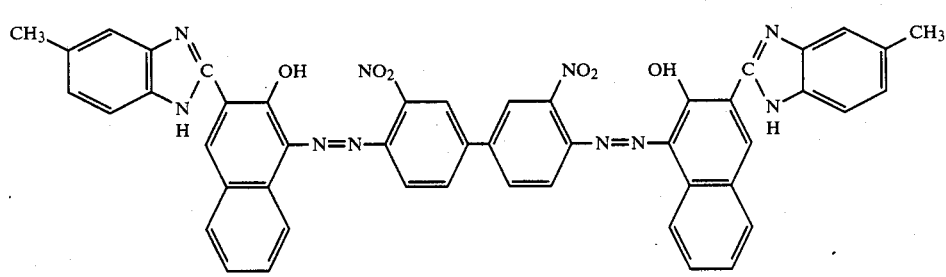
(12)

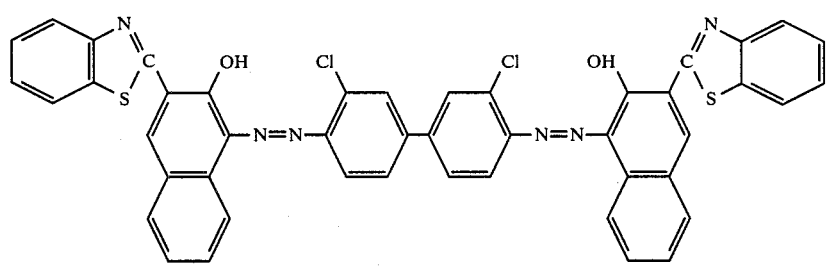
(13)
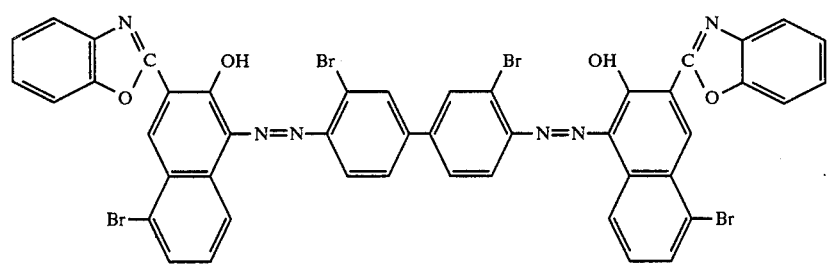
(14)
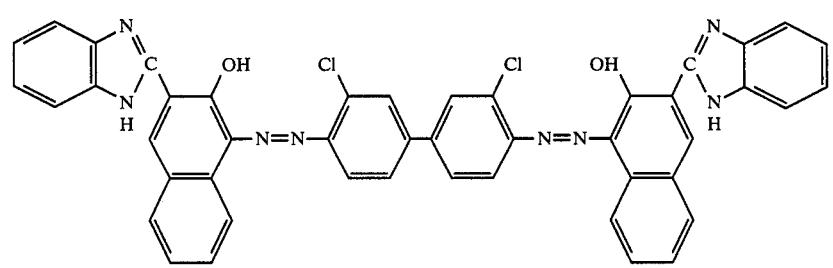
(15)
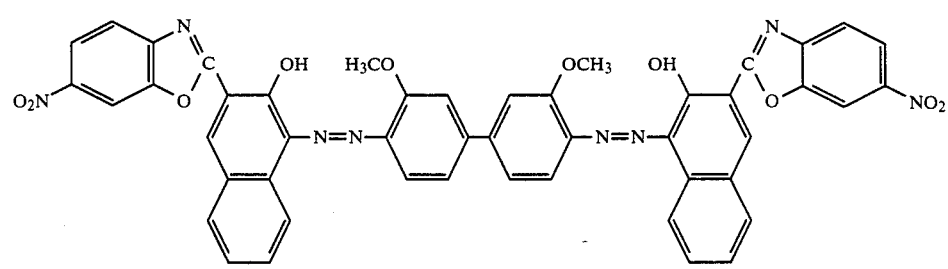
(16)
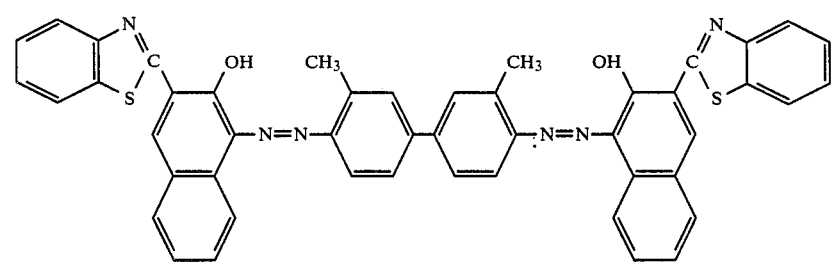
(17)
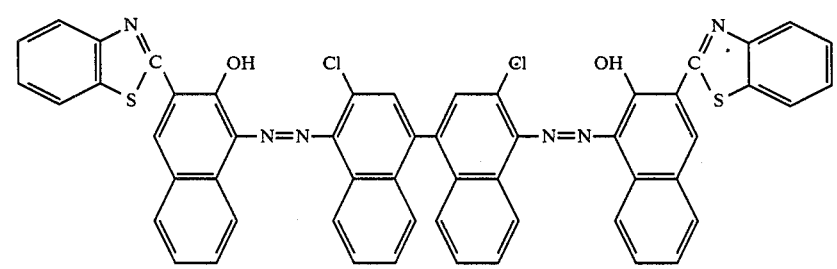
(18)

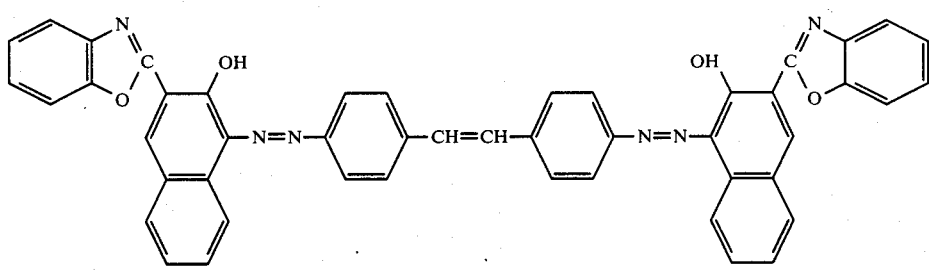
(19)
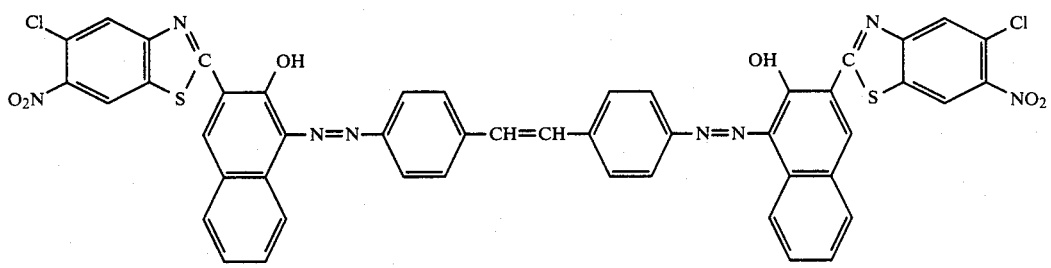
(20)
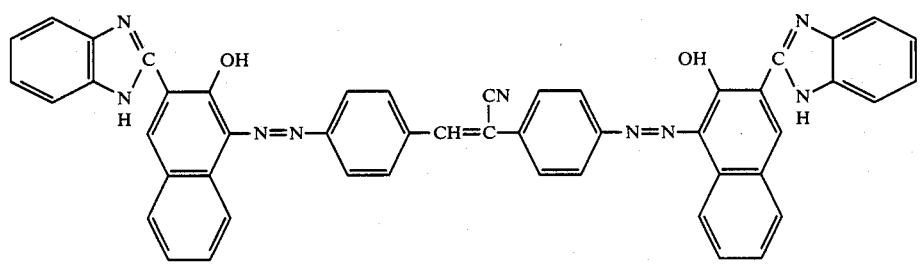
(21)
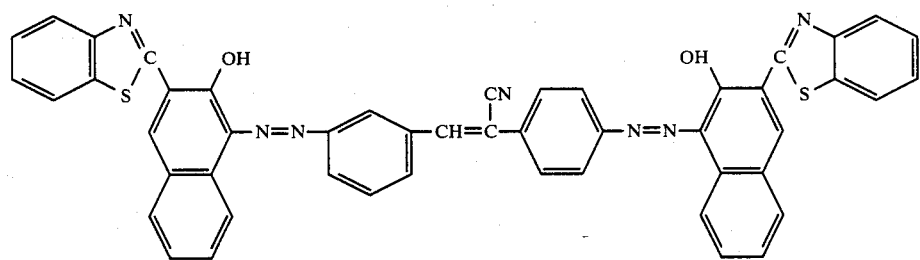
(22)
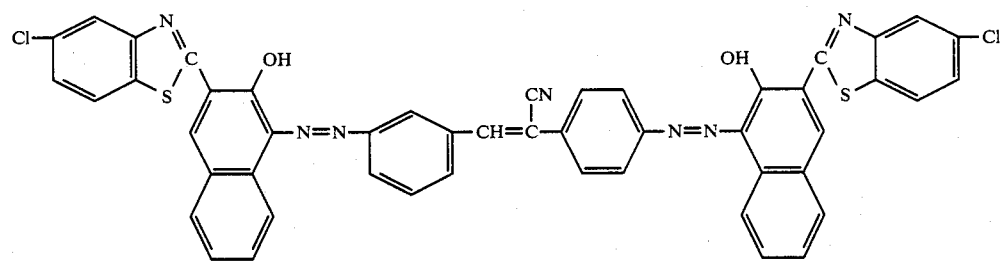
(23)
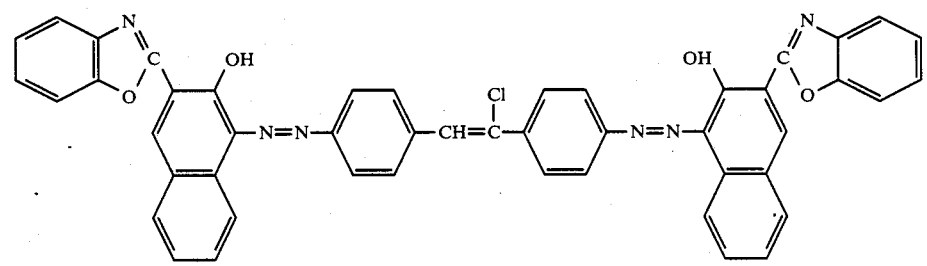
(24)

-continued
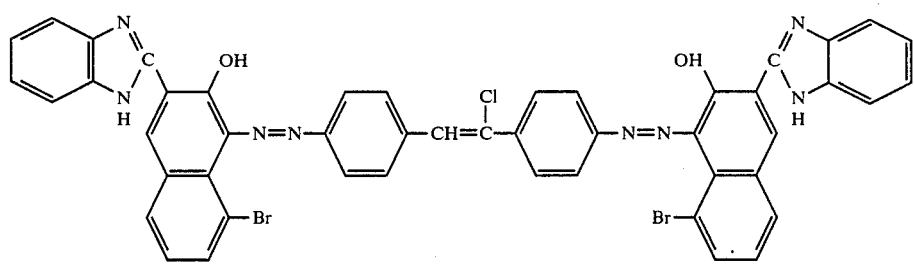
(25)
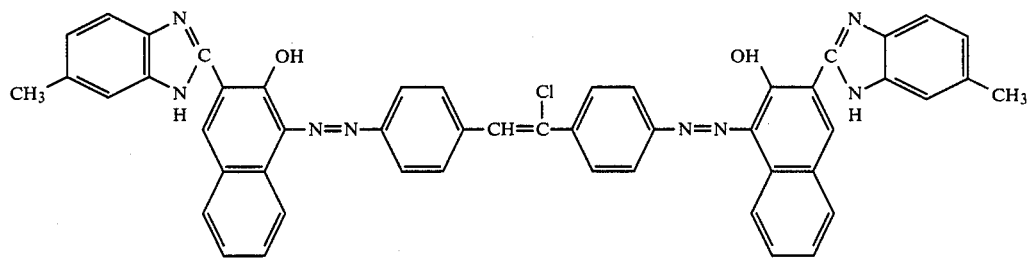
(26)
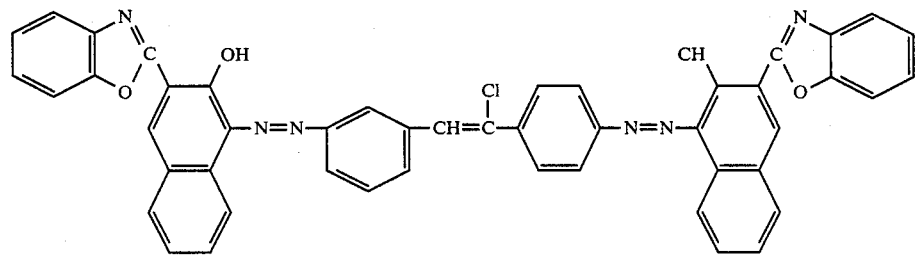
(27)
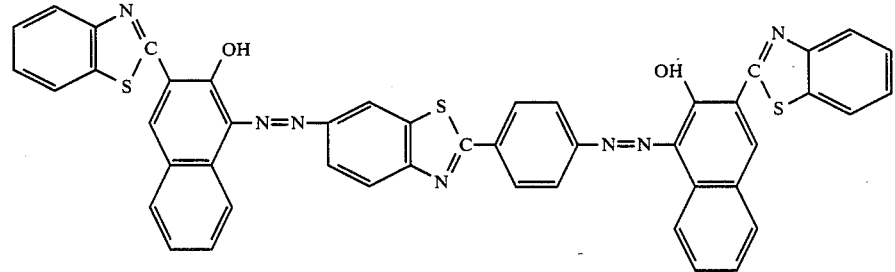
(28)
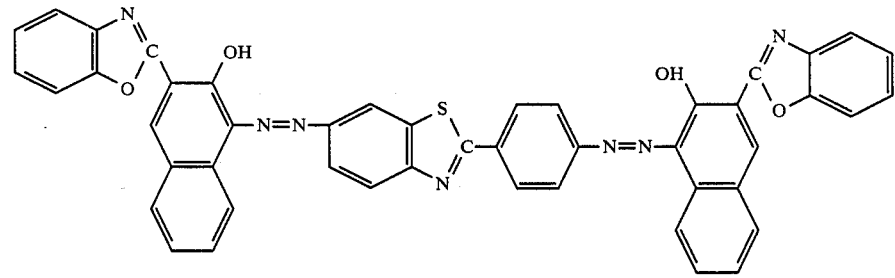
(29)
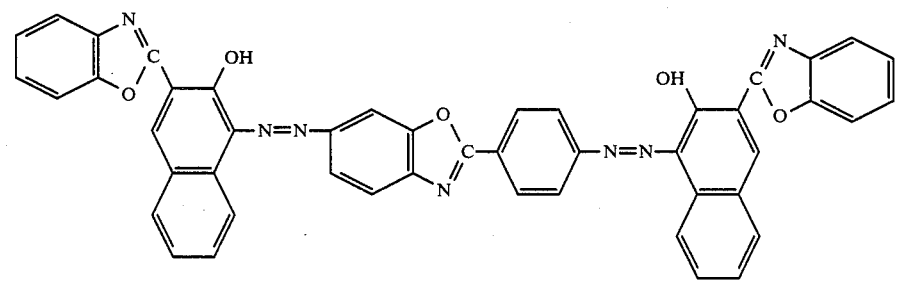
(30)

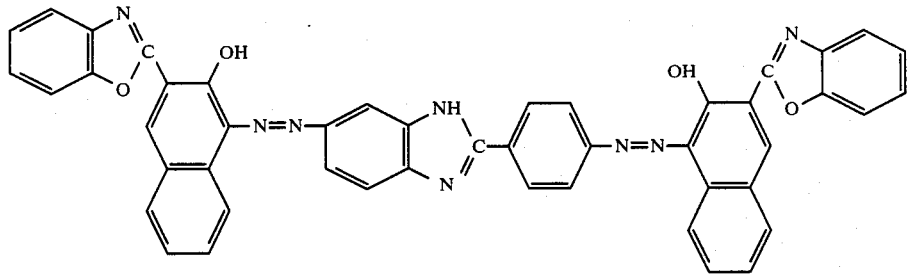
(31)
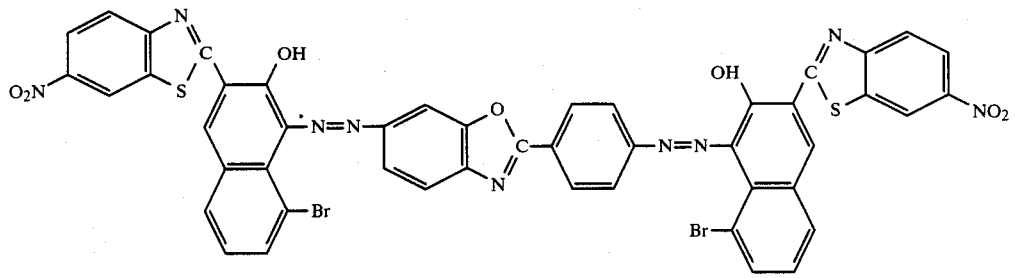
(32)
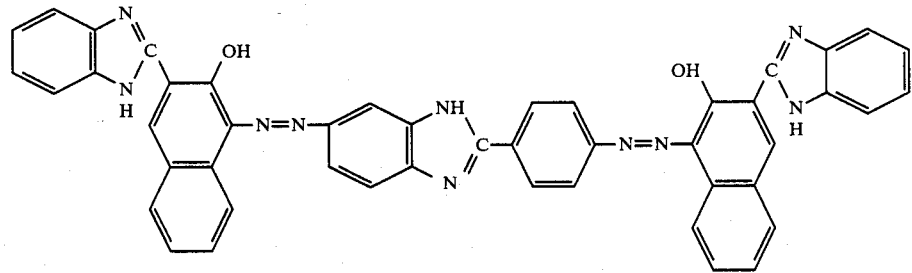
(33)
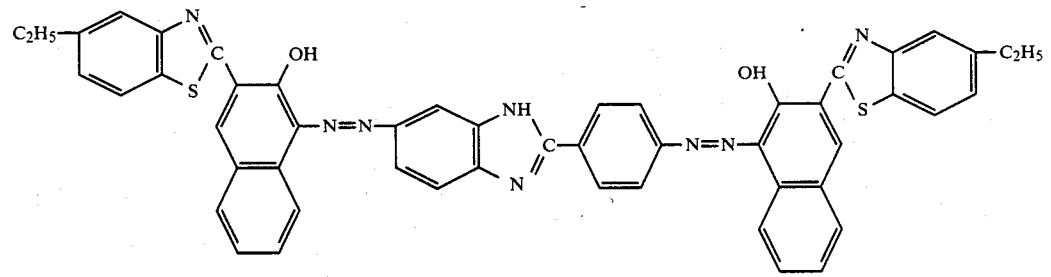
(34)
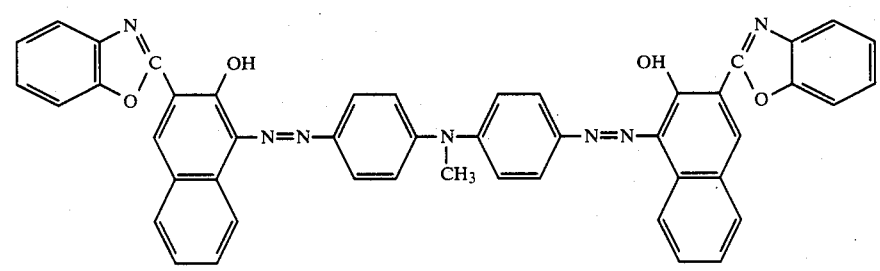
(35)

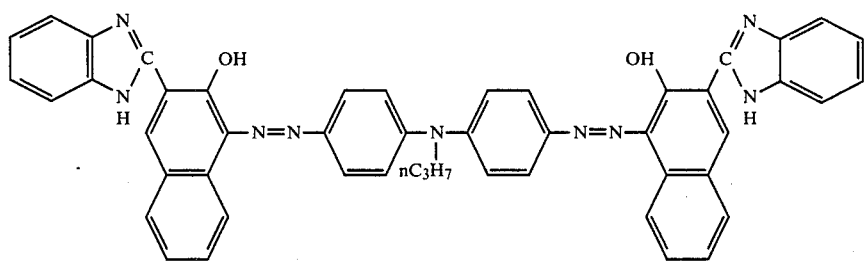
(36)
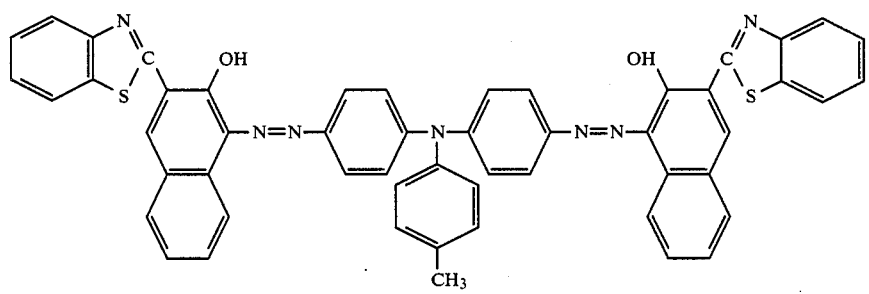
(37)
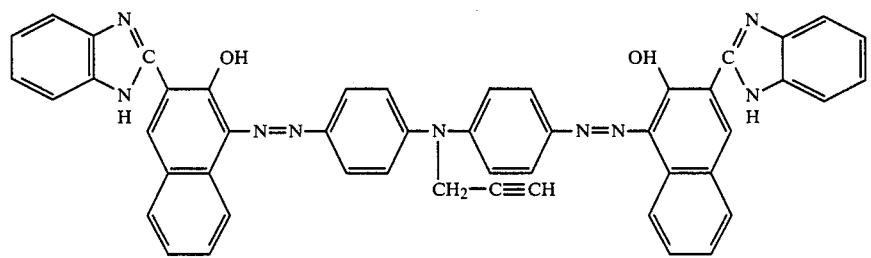
(38)
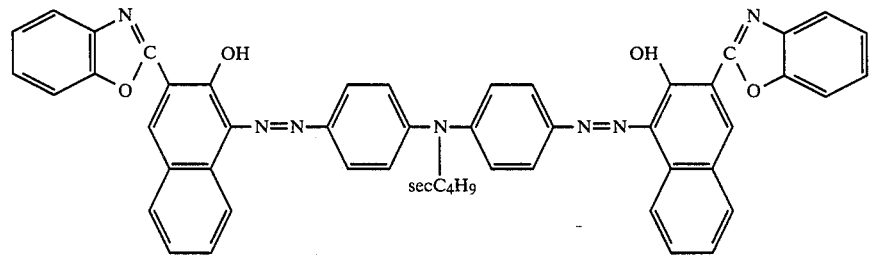
(39)
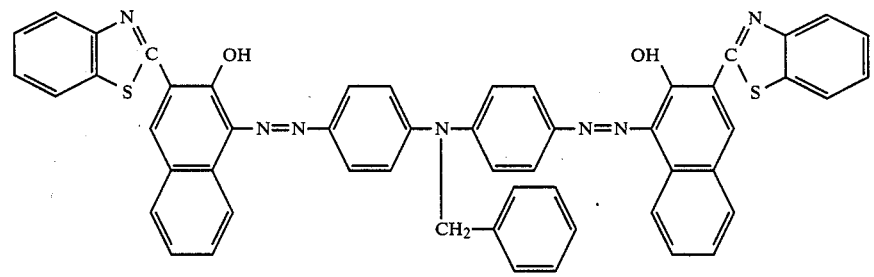
(40)
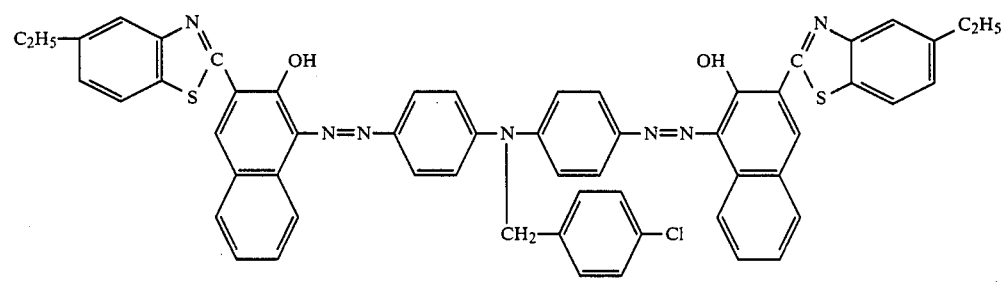
(41)

-continued
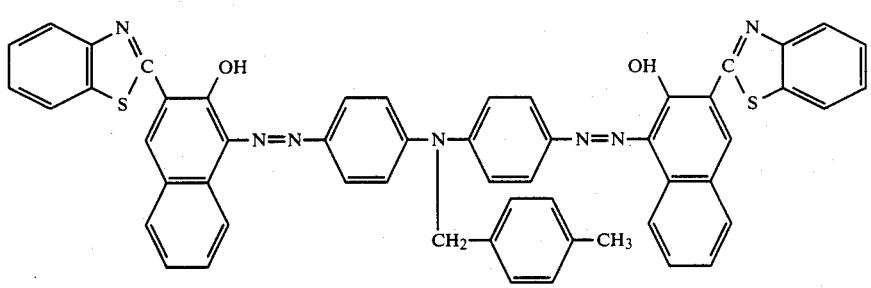
(42)
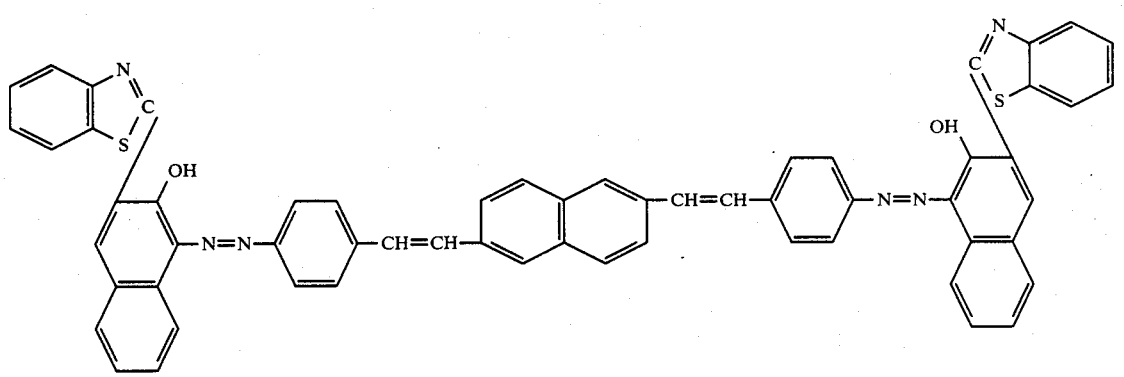
(43)
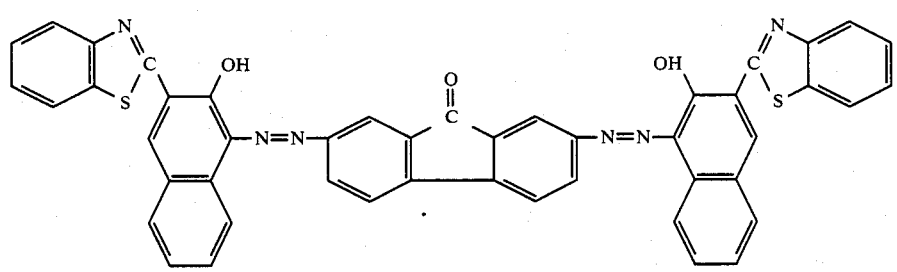
(44)
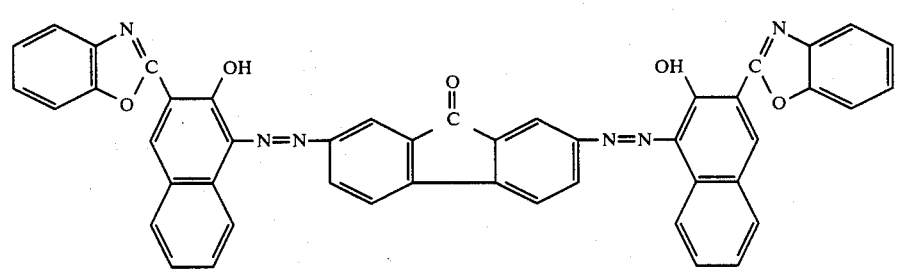
(45)
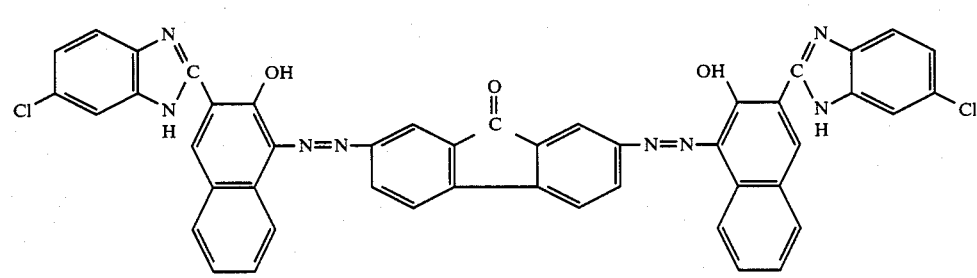
(46)

-continued
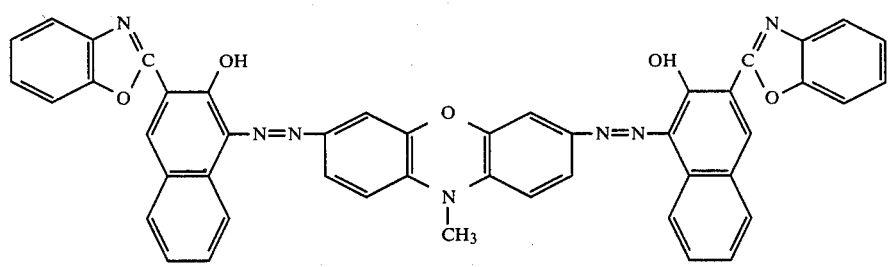
(47)
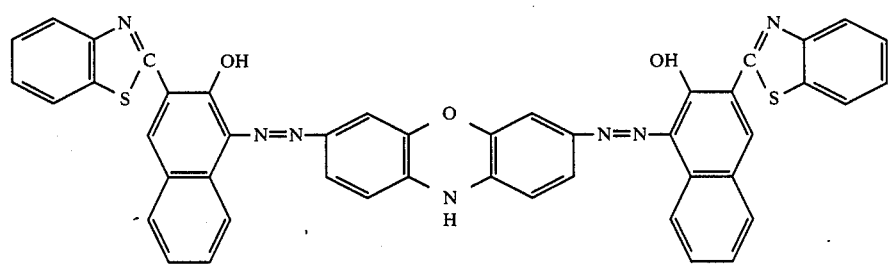
(48)
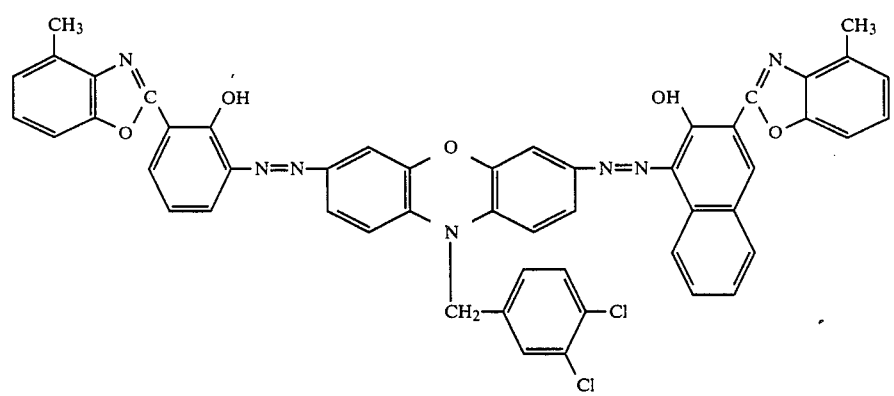
(49)
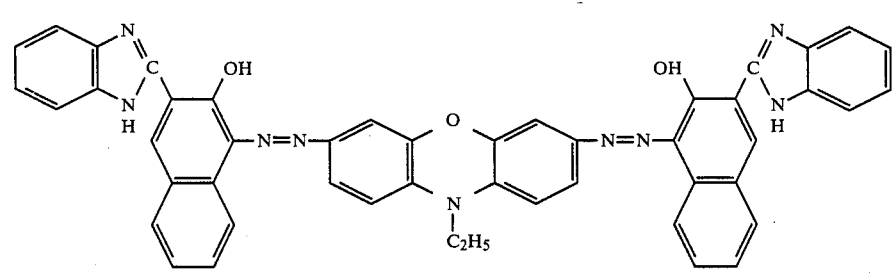
(50)
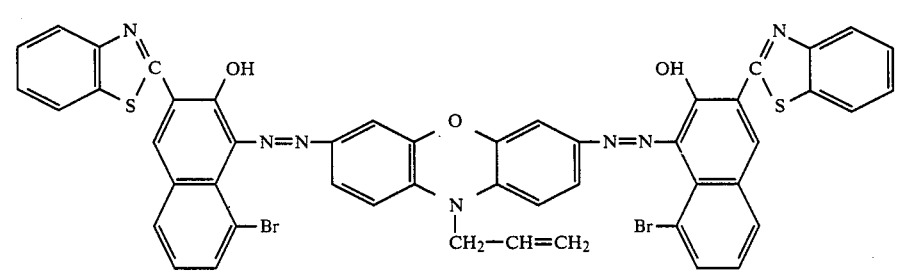
(51)

-continued
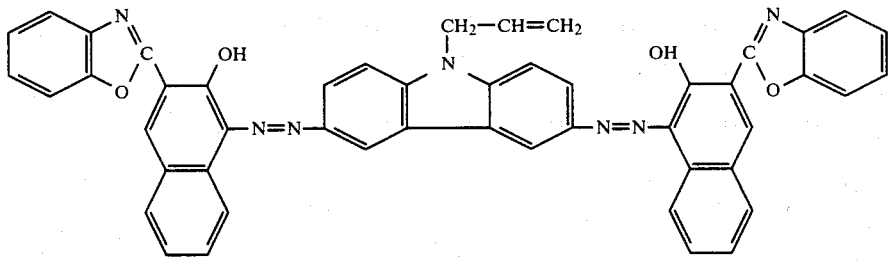
(52)
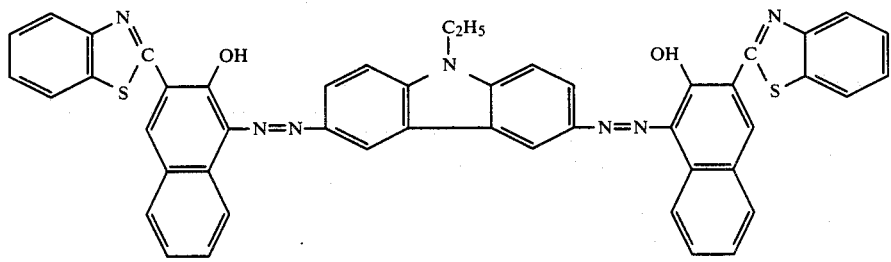
(53)
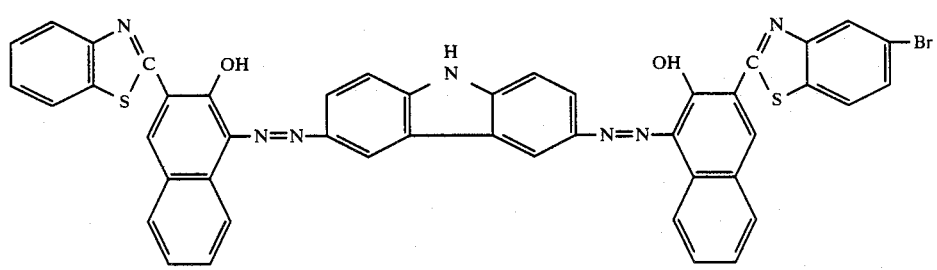
(54)
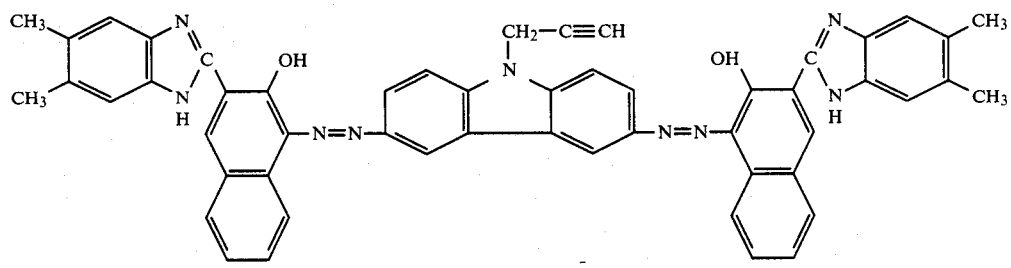
(55)
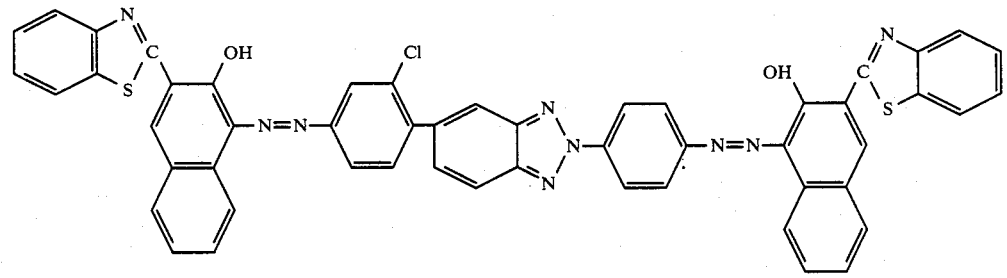
(56)
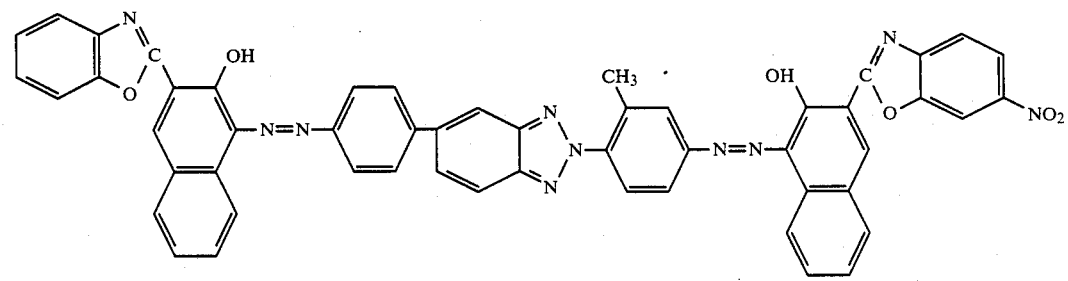
(57)

-continued

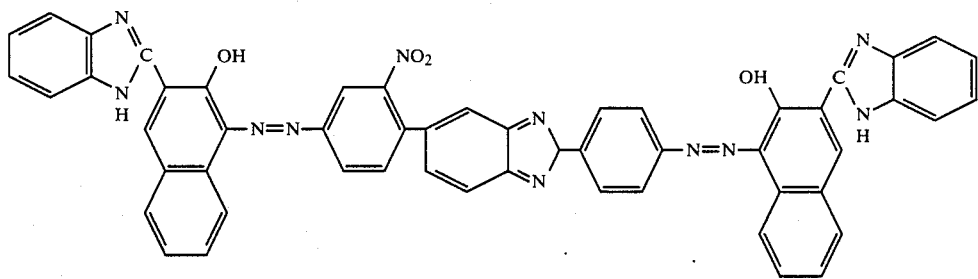
(58)

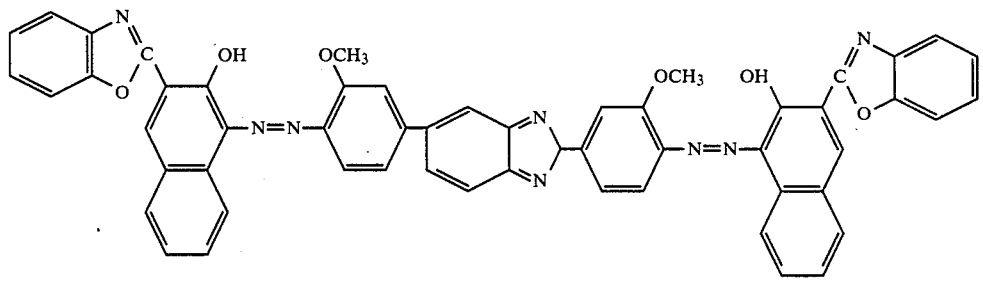
(59)

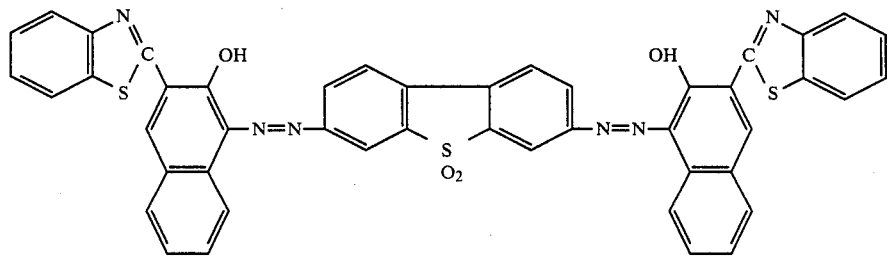
(60)

Examples of synthesis of the azo pigments used in this invention are described below.

SYNTHETICAL EXAMPLE 1

(Synthesis of trisazo pigment No. 8)

A solution of 0.7 g of sodium nitrite in least possible water was added dropwise, while being cooled in ice, to a solution of 0.9 g of p,p',p''-tris(p-aminophenyl) amine in a mixture of 1.5 ml of 12-N hydrochloric acid and 30 ml of dimethylformamide. The resulting mixture was allowed to react, while being cooled, for about one hour. After addition of activated carbon, the reaction mixture was filtered to obtain a diazonium solution. The solution was then added dropwise to a coupler solution, cooled to 0°-5° C., containing 4.5 g of a coupler having a skeletal structure of 2-hydroxy-3-(2-benzothiazoyl)-11H-benzo carbazole represented by the formula

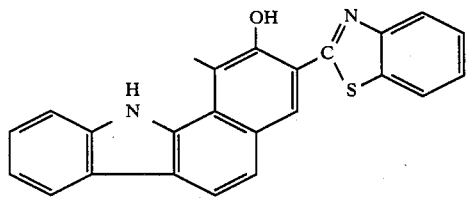

and 7 g of triethylamine in 100 ml of dimethylformamide. The resulting blackish blue pasty liquid was stirred for 3 hours while being kept at 0°-10° C. The precipitate, which was formed, was collected by filtration, washed with acetone, then thoroughly with water. The precipitate was washed again with acetone and dried to yield 4.7 g of a black powder having more or less a metallic luster and melting at 350° C. or above.

SYNTHETICAL EXAMPLE 2

(Synthesis of bisazo pigment No. 13)

An aqueous solution of 1.4 g (21 mmoles) of sodium nitrite was added dropwise, while being cooled in ice, to a dispersion of 2.5 g (10 mmoles) of 3,3'-dichlorobenzidine in a mixture of 6 ml of concentrated hydrochloric acid and 20 ml of water. The mixture was allowed to react for one hour while being cooled. After addition of activated carbon, the reaction mixture was filtered to obtain an aqueous tetrazonium solution. The solution was added dropwise to a coupler solution, cooled to 0°-5° C., containing 5.6 g (20 mmoles) of 3-(2-benzothiazolyl)-2-naphthol (melting point: 183.5°-185.0° C.), a coupler component, and 6 g (40 mmoles) of triethanolamine in a mixture of 20 ml of dimethylformamide (DMF) and 200 ml of dimethyl sulfoxide (DMSO). The resulting bluish violet pasty liquid was stirred for 3 hours, while being kept at 0°-10° C. The precipitate which was formed was collected by filtration, washed with acetone, then thoroughly with water, and extracted in a Soxhlet extractor with ethyl acetate used as extracting and washing liquor. After drying, there was obtained 4.8 g of a bluish violet powder melting at 335° C. (decomp.).

SYNTHETICAL EXAMPLE 3

(Synthesis of bisazo pigment No. 35

An aqueous solution of a tetrazonium salt was prepared in a manner substantially similar to that in Synthetical Example 2. The coupling reaction was allowed to take place, while being cooled in ice, in a reaction medium comprising DMF and water by using said tetrazonium salt solution, 3-(2-benzoxazolyl)-2-naphthol (melting point: 173.5°-176° C.) used as coupler component, and triethylamine as an organic amine. The reaction mixture was purified in the same manner as in Synthetical Example 2 to yield a violet powder melting at 312° C. (decomp.).

Other azo pigments used in this invention can by synthesized in a manner similar to those in the above Synthetical Examples.

The photosensitive layers of the present electrophotographic photoreceptor usually include the following 4 types:

(1) A photosensitive layer composed of an azo pigment;
(2) A photosensitive layer containing an azo pigment dispersed in a binder;
(3) A photosensitive layer containing an azo pigment dispersed in a known charge transfer substance;
(4) A photosensitive layer in which the photosensitive layer (1), (2) or (3) serves as a CGL and overlaid with a CTL containing a charge transfer substance.

Upon absorption of light, the azo pigment generates a charge carrier in a high efficiency. The generated carrier can move through the medium of pigment but preferably through a medium comprising a known carrier transport substance. From such viewpoint, a photosensitive layer of the type (3) or (4) is particularly preferred.

The charge transfer substances include electronic transport substances and hole transport substances. Both types of substances can be used in the photosensitive layer of the present photoreceptor. A mixture of substances of the same type or different type can also be used.

Electronic transport substances are electron-attracting compounds having an electron-attracting group such as nitro, cyano or ester group. As examples of such compounds, mention may be made of nitrated fluorenones such as 2,4,7-trinitrofluorenone and 2,4,5,7-tetranitrofluorenone; and tetracyanoquinodimethane, tetracyanoethylene, 2,4,5,7-tetranitroxanthone, 2,4,8-trinitrothioxanthone, and polymeric electron-attracting substances.

The hole transport substances are electron-donating organic photoconductors. As examples of such compounds, mention may be made of the following.

Hydrazones:

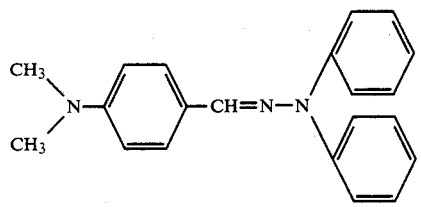 (1)

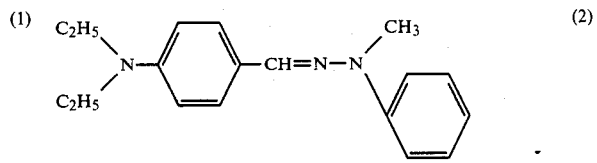 (2)

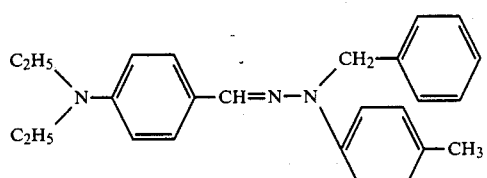 (3)

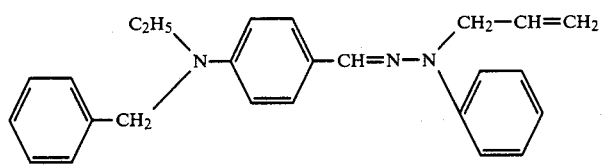 (4)

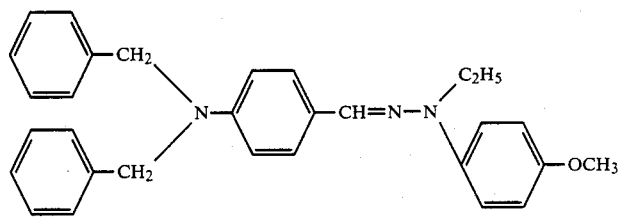 (5)

-continued
(6) 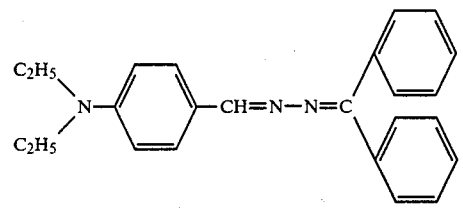
(7) 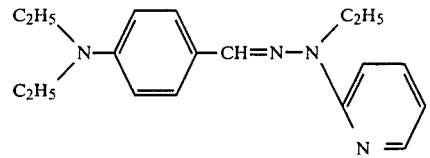
(8) 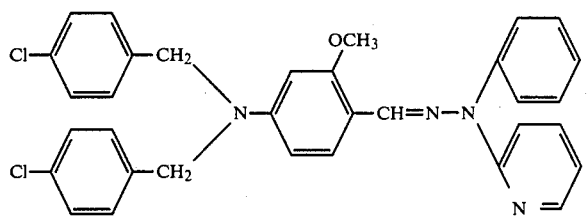
(9) 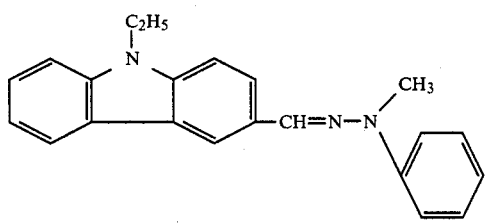
(10) 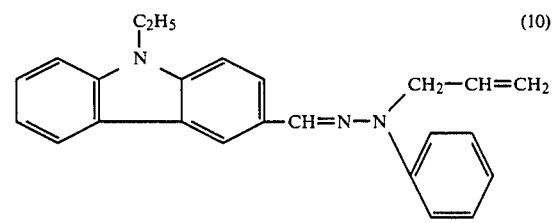
(11) 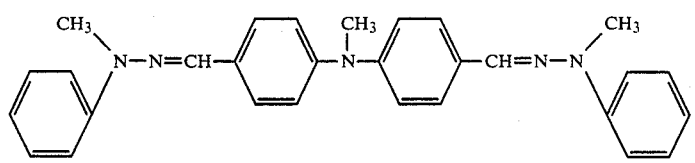
(12) 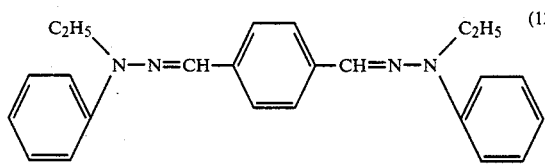
(13) 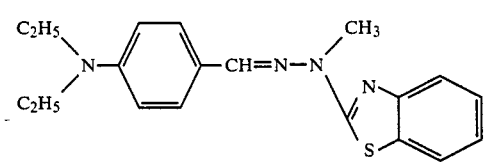
(14) 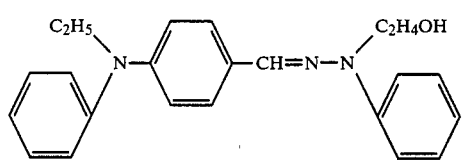
(15) 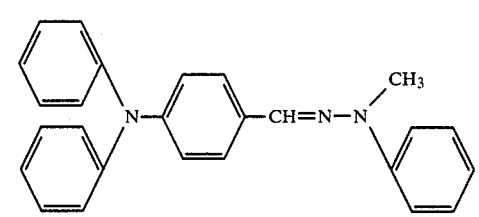
Pyrazolines:
(1) 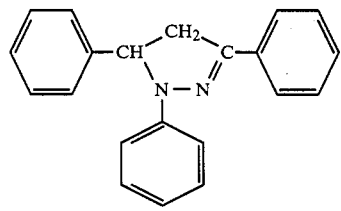
(2) 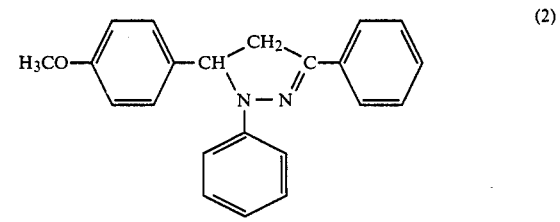

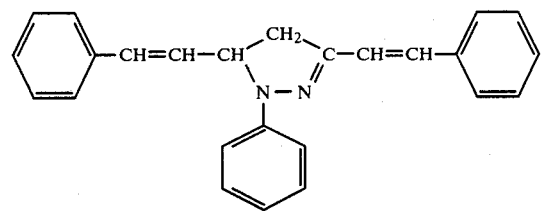
(3)
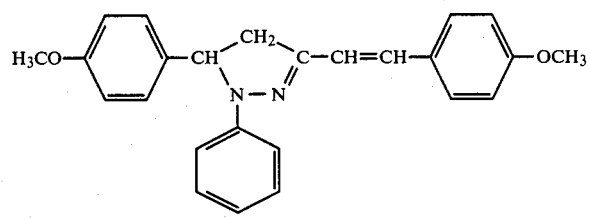
(4)
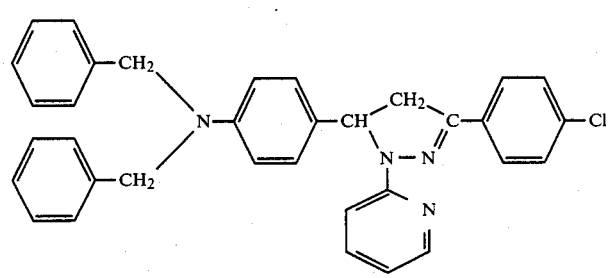
(5)
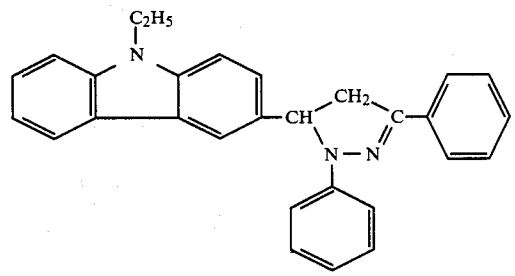
(6)
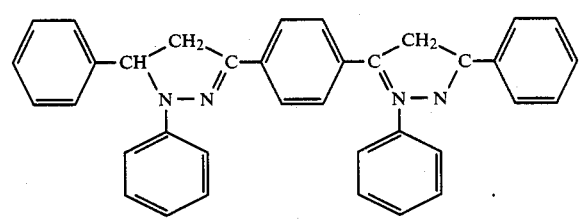
(7)
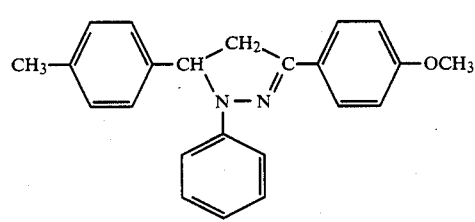
(8)
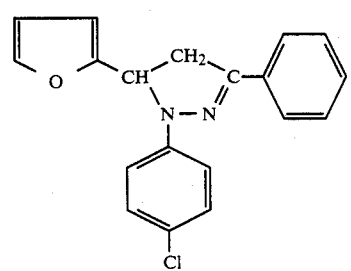
(9)

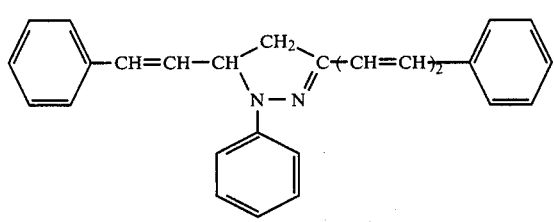
(10)
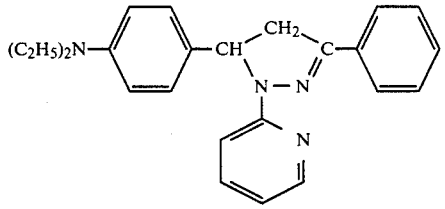
(11)
Diarylalkanes:
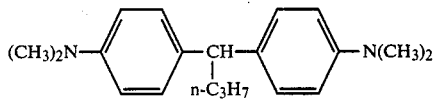
(1)
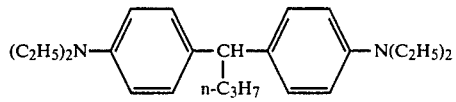
(2)
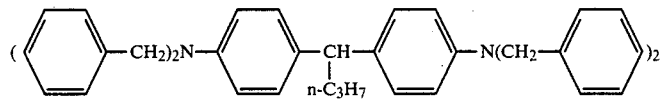
(3)
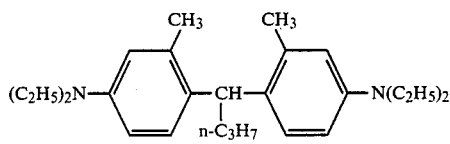
(4)
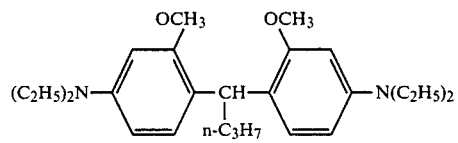
(5)
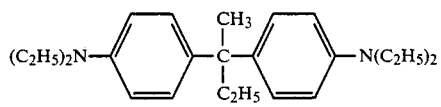
(6)
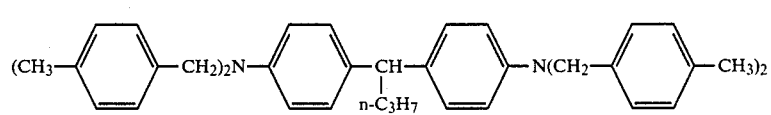
(7)
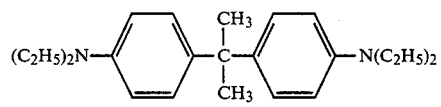
(8)
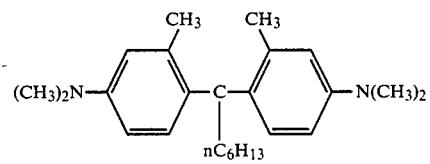
(9)
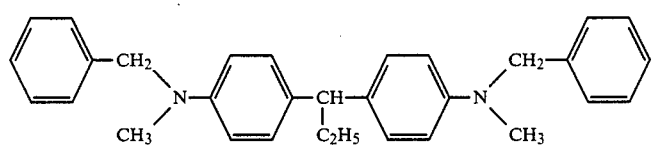
(10)
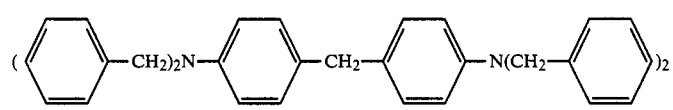
(11)
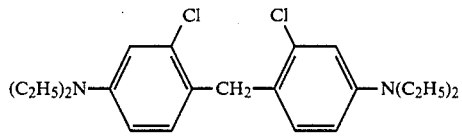
(12)
Alkylenediamines:

-continued
(1) 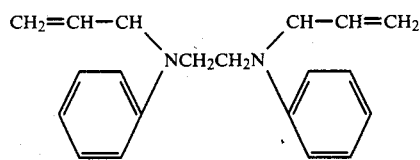
(2) 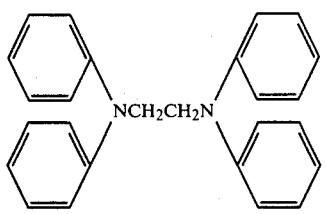
(3) 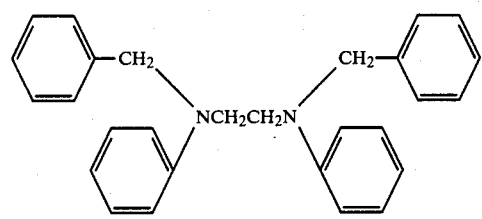
(4) 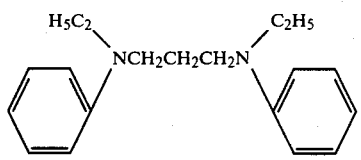
(5) 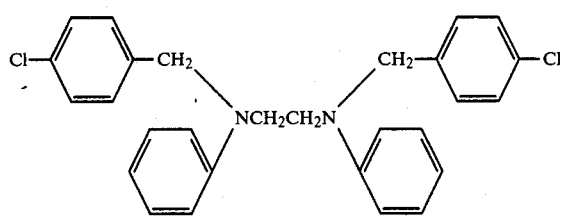
Dibenzylanilines:
(1) 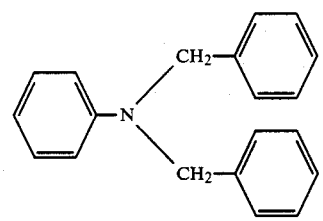
(2) 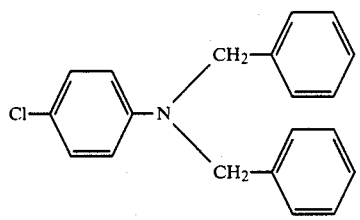
(3) 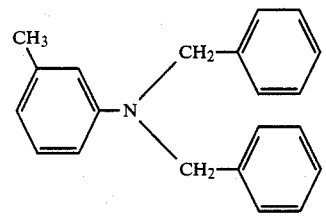
(4) 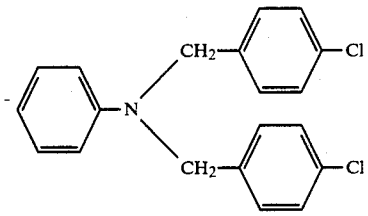
(5) 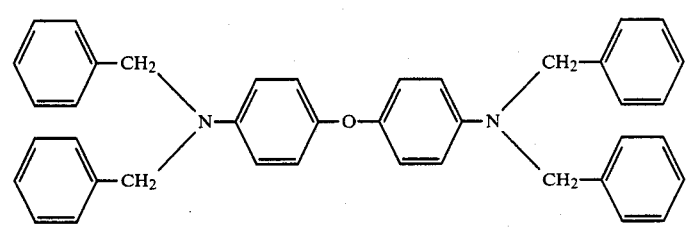
(6) 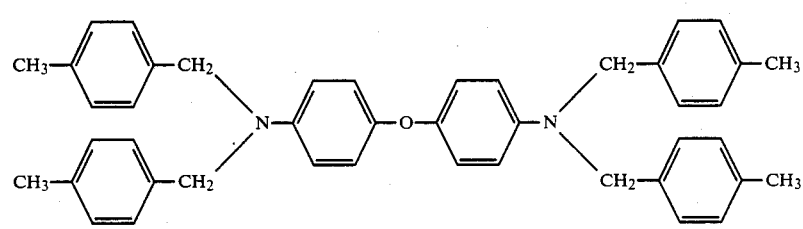

-continued
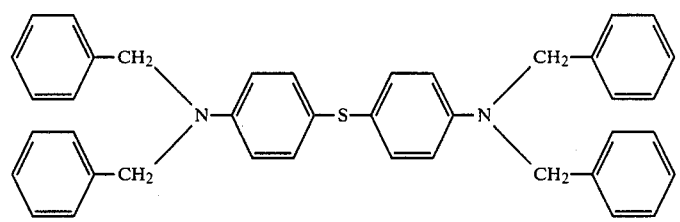
(7)
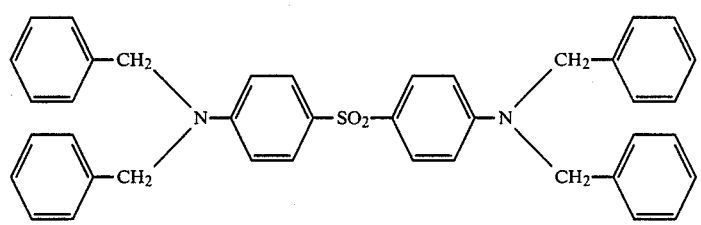
(8)
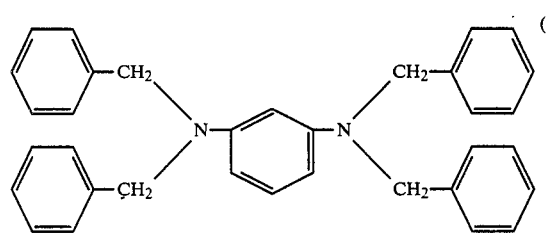
(9)
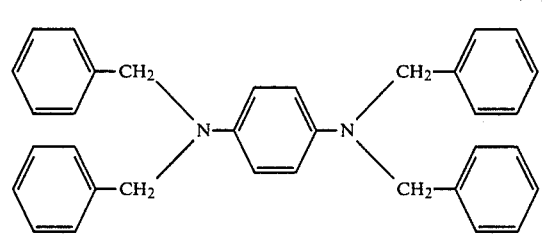
(10)
Triphenylamines:
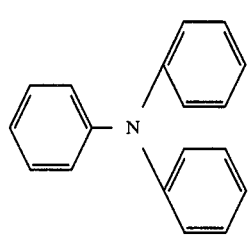
(1)
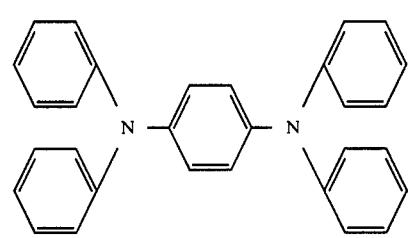
(2)
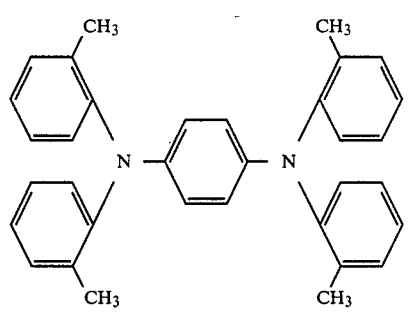
(3)
Diphenylbenzylamines:
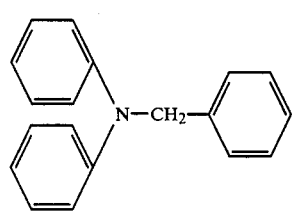
(1)
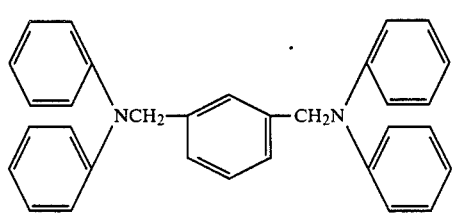
(2)
Triarylalkanes:

-continued
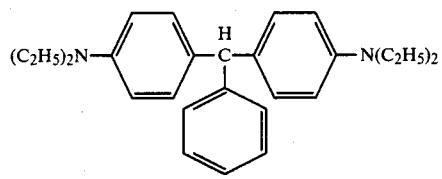 (1)
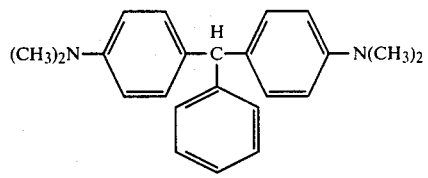 (2)
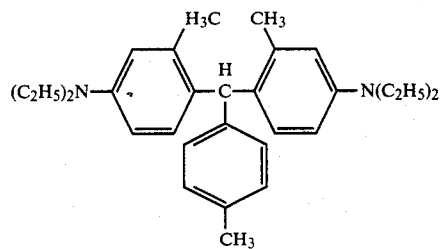 (3)
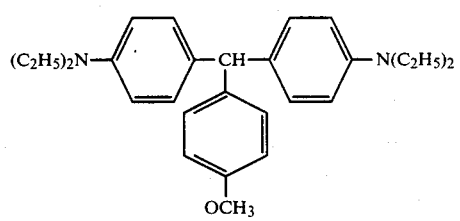 (4)
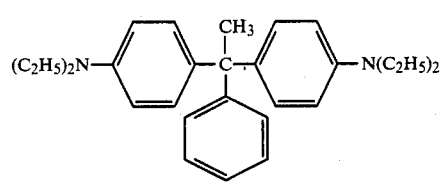 (5)
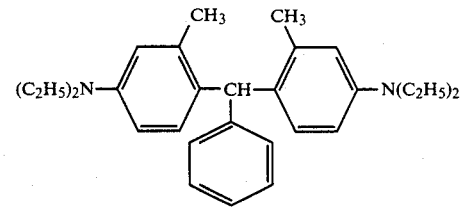 (6)
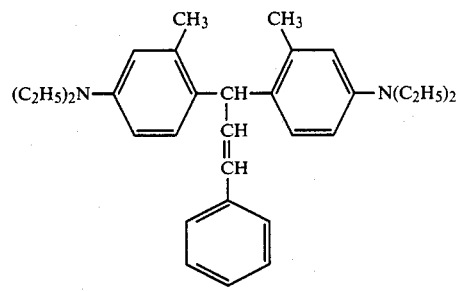 (7)
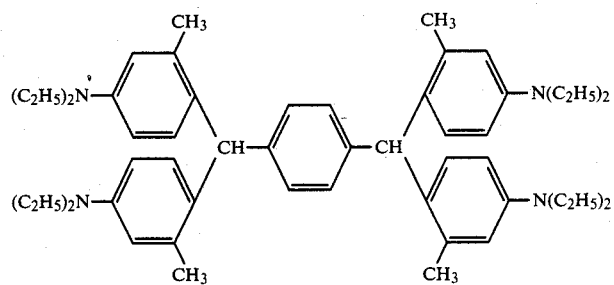 (8)
Oxadiazoles:
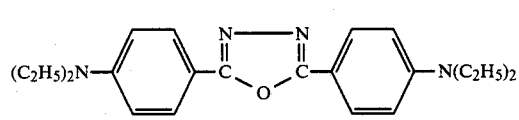 (1)
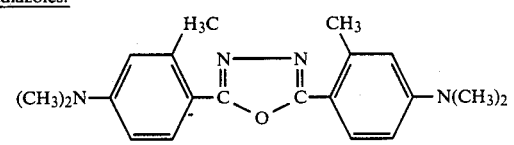 (2)
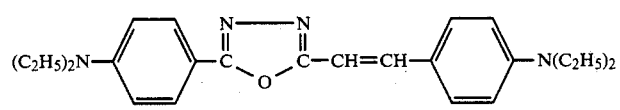 (3)
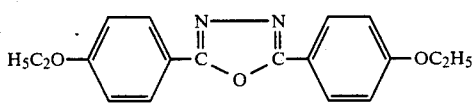 (4)

(5)
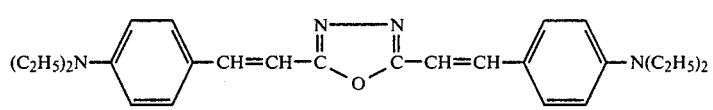
(6)
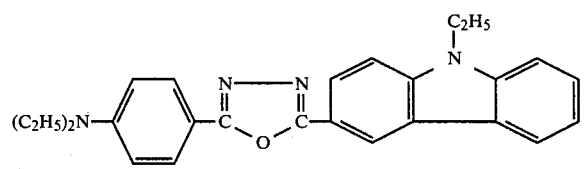
(7)
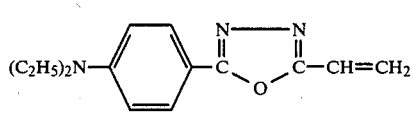
Anthracenes:
(1)
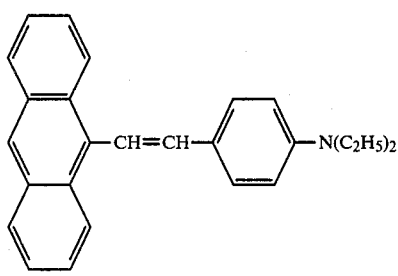
(2)
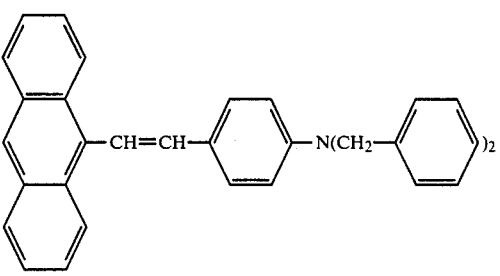
(3)
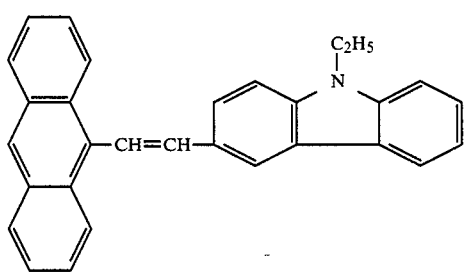
Oxazoles:
(1)
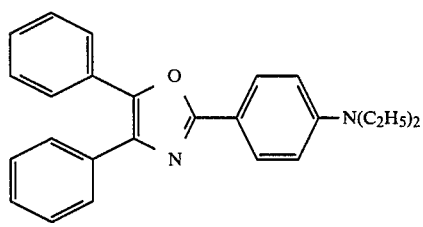
(2)
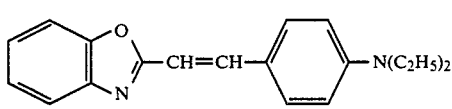
(3)
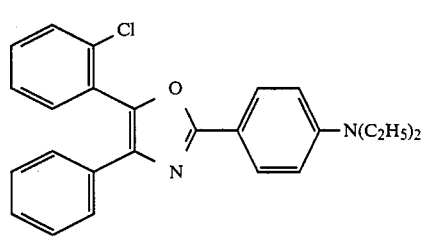
(4)
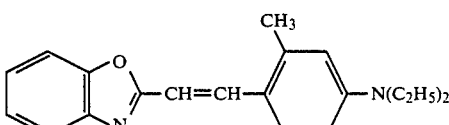

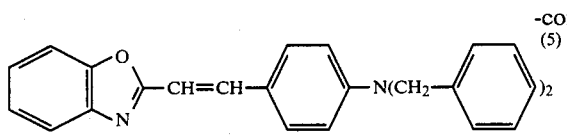
(5)

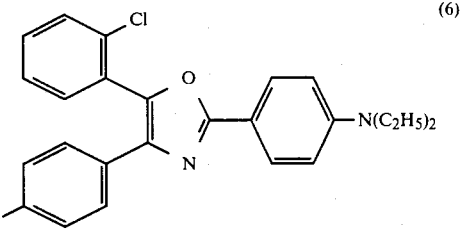
(6)

Thiazoles:

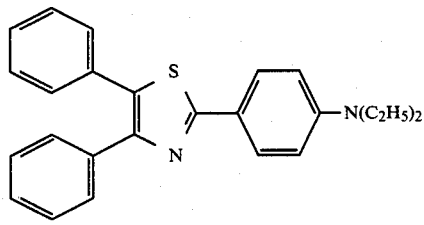
(1)

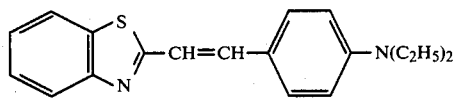
(2)

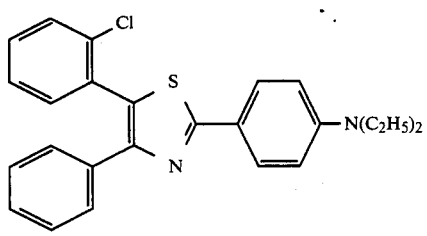
(3)

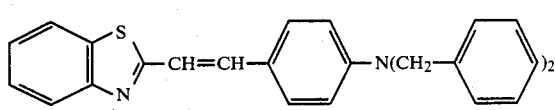
(4)

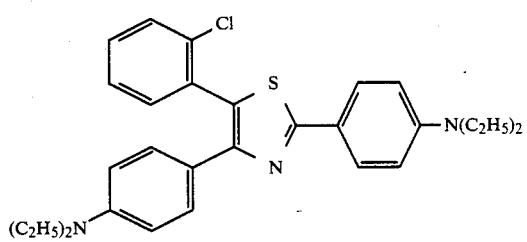
(5)

Other hole transport substances include polymers such as poly-N-vinylcarbazole, halogenated poly-N-vinylcarbozoles, polyvinylpyrenes, polyvinylanthracenes, polyvinylacridines, polyglycidylcarbazoles, polyvinylacenaphthylene, and ethylcarbazole-formaldehyde resins.

Carrier transport substances other than those listed above can also be used. The carrier transport substances are used each alone or in combinations.

The present electrophotographic photoreceptor can be produced in a customary manner. For instance, a photoreceptor having a photosensitive layer of the type (1) is produced by dissolving or dispersing the aforesaid azo pigment in a suitable medium to form a coating composition, applying the coating composition onto an electroconductive support, and drying the coating so that a photosensitive layer of usually from several μm to several tens μm in thickness is formed on the support. As examples of coating media, there may be mentioned basic solvents capable of dissolving the azo pigments, such as n-butylamine and ethylenediamine; solvents capable of dispersing the azo pigments including ethers such as tetrahydrofuran and 1,4-dioxane; ketones such as methyl ethyl ketone or cyclohexanone; aromatic hydrocarbons such as toluene and xylenes; aprotic polar solvents such as N,N-dimethylformamide, acetonitrile, N-methylpyrrolidone and dimethyl sulfoxide; alcohols such as methanol, ethanol, and isopropanol; esters such as ethyl acetate, methyl acetate, and "Methylcellosolve" acetate; and chlorinated hydrocarbons such as dichloroethane and chloroform.

When a medium capable of dispersing the azo pigments is used, the particle size of the azo pigment should be reduced to 5 μm or below, preferably 3 μm or below, most preferably 1 μm or below.

The conductive support, on which the photosensitive layer is formed, can be any of those used in conventional electrophotographic photoreceptors such as, for example, metallic drums or sheets of aluminum or copper; nonconductive materials clad or vacuum plated with said metals; plastic films, plastic drums, or paper sheets coated with a mixture of suitable binders and conductive materials such as powdered metals, carbon black, copper iodide, polyelectrolytes, and the like; and conductive plastics sheets or drums containing conductive materials such as powdered metals, carbon black, carbon fiber, and the like.

A photoreceptor having a photosensitive layer of the type (2) is produced by using a coating composition prepared by adding a binder to the coating composition for the photosensitive layer of type (1). The solvent used in the coating composition is preferably one capable of dissolving the binder. As examples of suitable binders, mention may be made of polymers and copolymers of vinyl compounds such as styrene, vinyl acetate, acrylic esters, and methacrylic esters; phenoxy resins, polysulfones, arylate resins, polycarbonates, polyesters, cellulose esters, cellulose ethers, urethane resins, epoxy resins, and acrylopolyol resins. The binder is used in an amount of 0.1 to 5 parts by weight for 1 part of the azo pigment. In forming the photosensitive layer of this type, it is desirable that azo pigment be dispersed in the form of fine particle size such as, for example, 3 μm or below, preferably 1 μm or below in the binder.

A photoreceptor having a photosensitive layer of the type (3) can be produced by using a coating composition prepared by dissolving a charge transport medium in the coating composition for the photosensitive layer of type (1). The aforementioned charge transport media can be used. It is desirable to use a binder, except for those charge transport media which serve also as binder, such as polyvinylcarbazole, polyglycidylcarbazole, and the like. The aforementioned binders can be used in an amount of generally 1 to 100 parts by weight for 1 part of the azo pigment. The amount used of the charge transport medium is generally 0.2 to 1.5, preferably 0.3 to 1.2, parts by weight for 1 part of the binder.

The charge transport media which serve also as binder is used in an amount of 1 to 10 parts by weight for 1 part of the azo pigment. As described above in connection with the photosensitive layer of type (3), it is also desirable in this case that the azo pigment be dispersed in the form of fine particle throughout the matrix of a charge transport medium and a binder.

A photoreceptor having a photosensitive layer of the type (4) can be produced by coating the photosensitive layer of the type (1), (2), or (3) with a coating composition prepared by dissolving a charge transport medium in a suitable solvent, and drying to form a charge transport layer. In this case the photosensitive layer (1), (2) or (3) serves as charge generation layer. The charge transport layer is not necessarily produced on the charge generation layer but can be provided between the charge generation layer and the conductive support, though the former arrangement is preferred in view of the durability.

The charge transport layer can be formed similarly to the formation of photosensitive layer of the type (3) by using the coating composition used in the formation of photosensitive layer of the type (3) but containing no azo pigment. The charge transport layer is generally 5 to 50 μm in thickness.

The photosensitive layer of the present electrophotographic photoreceptor may contain known sensitizers. Suitable sensitizers include Lewis acids and dyes which form charge transfer complexes with organic photoconductors.

As examples of suitable Lewis acids, there may be mentioned electron-attracting compounds including quinones such as chloranil, 2,3-dichloro-1,4-naphthoquinone, 2-methylanthraquinone, 1-nitroanthraquinone, 1-chloro-5-nitroanthraquinone, 2-chloroanthraquinone, and phenanthraquinone; aldehydes such as 4-nitrobenzaldehyde; ketones such as 9-benzoylanthracene, indanedione, 3,5-dinitrobenzophenone, and 3,3',5,5'-tetranitrobenzophenone; acid anhydrides such as phthalic anhydride and 4-chloronaphthalic acid anhydride; cyano compounds such as tetracyanoethylene, terephthalmalononitrile, and 4-nitrobenzalmalononitrile; 3-benzalphthalide, 3-(α-cyano-p-nitrobenzal)phthalide, and 3-(α-cyano-p-chlorobenzal) phthalide.

Example of suitable dyes are triphenylmethane dyes such as Methyl Violet, Brilliant Green, and chrystal violet; thiazine dyes such as Methylene Blue; quinone dyes such as quinizarin; cyanine dyes, pyrylium salts, and thiapyrylium salts, and benzopyrylium salts.

The photosensitive layer of the present electrophotographic photoreceptor may further contain inorganic photoconductive fine particles such as selenium, selenium-arsenic alloy, etc. and organic photoconductive pigments such as copper phthalocyanine pigment, perylene pigment, etc.

The photosensitive layer of the present electrophotographic photoreceptor may further contain known plasticizers to improve the film-forming property, flexibility and mechanical strengths. Suitable plasticizers include phthalic esters, phosphoric esters, epoxy compounds, chlorinated paraffin, chlorinated aliphatic carboxylic esters, and aromatic compounds such as methylnaphthalene. The photosensitive layer may further contain, if necessary, an adhesive layer, intermediate layers and a transparent insulating layer.

The photoreceptor containing the azo pigments according to this invention is excellent in noncolor and color sensitivities, exhibits little charge in sensitivity and charge acceptance on repeated use, is low in optical fatique, and excellent in durability. The present photoreceptor will find use not only in electrophotographic copiers but also in other fields where the electrophotography is applicable, such as a printer which utilizes laser, Braun tube (CRT), and light-emitting diode (LED) as light source.

The invention is illustrated in detail below with reference to Examples but the invention is not limited thereto.

EXAMPLE 1

On a conductive support of polyester film having an aluminum foil laminated thereon (Alpet 85 of Daidokako Co., aluminum foil 10μ in thickness), there was formed an intermediate layer, 0.05μm in thickness, comprising a vinyl chloride-vinyl acetate-maleic anhydride copolymer (Eslex MF-10 of Sekisui Kagaku Co.). A charge carrier generation layer (CGL), 0.5μm in thickness, was formed on said intermediate layer by coating with an azo compound dispersion prepared by treating 2 g of the trisazo pigment No. 2, 2 g of a polyarylate resin (U-100 of Unitika Co.) and 100 ml of 1,2-dichloroethane in a paint conditioner for about one hour, and then drying. Then a charge carrier transport layer (CTL), 12μ in thickness, was formed on said CGL by coating with a solution containing 5 g of N,N-dibenzylaminobenzaldehyde-1,1-diphenylhydrazone, a charge carrier transport substance, and 7 g of a polyarylate resin in 50 ml of 1,2-dichloroethane, and drying. There was thus obtained an electrophotographic photoreceptor of this invention. The photoreceptor was kept in the dark place at 30° C. for 1 week and mounted on an electrostatic paper testing apparatus (SP-428 of Kawaguchi Denki Seisakusho Co.) to perform the following characteristics tests:

The photoreceptor was charged by exposing for 5 seconds to corona discharge under application of a voltage of −6 KV. The potential on the charged surface was $V_o$ (−V) (initial potential). The charged surface was then exposed to the light from a halogen lamp at an intensity of illumination of 30 lux on the surface of the photosensitive layer to determine the exposure $E_{\frac{1}{2}}$(lux·sec.) necessary for one-half decay of the initial potential. The photosensitive layer was further exposed to the halogen lamp at an intensity of illumination of 30 lux to determine the exposure $E_{50}$ (lux·sec.) necessary to bring the surface potential down to 50 (−V). The above procedure was repeated 500 cycles to evaluate the characteristics for repeated use. Between each cycle of exposure to the halogen lamp, the residual potential on the surface was completely removed by exposing for 0.3 second to the light from a tungsten lamp at an intensity of illumination of 300 lux.

The results of test were as shown in Table 1.

TABLE 1

|  | 1st Cycle | 500th Cycle |
| --- | --- | --- |
| $V_o$ (−V) | 840 | 840 |
| $E_{\frac{1}{2}}$ (lux · sec.) | 2.5 | 2.4 |
| $E_{50}$ (lux · sec.) | 5.2 | 4.9 |

EXAMPLES 2 to 6

Five kinds of electrophotographic photoreceptors were prepared in the same manner as in Example 1, except that trisazo pigments Nos. 4, 8, 14, 31 and 35 were used in place of the trisazo pigment No. 2. Each photoreceptor was tested for the characteristics as in Example 1. The results of test were as shown in Table 2.

TABLE 2

| Example No. | Trisazo pigment No. | First cycle | | | 500th cycle | | |
| --- | --- | --- | --- | --- | --- | --- | --- |
| | | Vo (−V) | $E_{\frac{1}{2}}$ (lux · sec.) | $E_{50}$ (lux · sec.) | Vo (−V) | $E_{\frac{1}{2}}$ (lux · sec.) | $E_{50}$ (lux · sec.) |
| 2 | 4 | 930 | 2.8 | 6.0 | 930 | 2.7 | 5.8 |
| 3 | 8 | 840 | 2.1 | 4.2 | 830 | 2.0 | 4.0 |
| 4 | 14 | 900 | 2.2 | 4.5 | 890 | 2.2 | 4.4 |
| 5 | 31 | 790 | 2.0 | 4.0 | 780 | 1.9 | 3.9 |
| 6 | 35 | 780 | 3.0 | 7.2 | 770 | 2.8 | 7.0 |

EXAMPLE 7

An aluminum drum, 60 mm in diameter, having mirror-finished surface was provided on the surface with an subbing layer, 0.1μ in thickness, of a vinyl acetate resin. A CGL of 0.5μ in thickness was formed on the subbing layer by coating with a dispersion prepared by treating 2 g of trisazo pigment No. 18 and 100 ml of 1,2-dichloroethane in a paint conditioner for about 3 hours, and drying. A CTL, 15μ in thickness, was formed on said CGL by coating with a solution containing 10 g of N,N-diethylaminobenzaldehyde-1-phenyl-1-allylhydrazone, a charge carrier transport substance of the formula

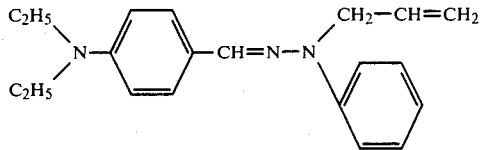

and 12 g of a polycarbonate resin (Panlite L-1250 of Teijin Ltd.) in 100 ml of 1,2-dichloroethane, and drying. There was thus obtained a drum-type electrophotographic photoreceptor according to this invention.

The photoreceptor was mounted on a remodelled commercial electrophotographic copier of the cartridge type and an image was reproduced. The reproduced image showed a high contrast, satisfactory sharpness and a high fidelity to the original. The copying was repeated 1,000 times. No significant difference was observed between the first copy and the last copy.

EXAMPLE 8

The reflection spectrum of the drum-type electrophotographic photoreceptor obtained in Example 7 was determined by means of a spectrophotometer (UV-365 of Shimadzu Seisakusho Ltd.) provided with integrating sphere. From the spectrogram, it was found that the maximum absorption wavelength of the photoreceptor in the visible region was around 760 nm. The spectral sensitivities at 770 nm and 780 nm were determined by means of a monochrometer. It was found that the optical energies required for the one-half decay were 6.7 erg/cm$^2$ (770 nm) and 6.9 erg/cm$^2$ (780 nm), indicating that the photoreceptor is usable in the case where a laser beam or a light-emitting diode is used as light source. The energy required for one-half decay of potential was nearly constant in the spectral range of from 500 nm to 800 nm, indicating uniform sensitivity in this region.

EXAMPLES 9 to 12

A conductive support of polyester film vacuumplated with aluminum was provided with a subbing layer (adhesive layer), 0.05μ in thickness, by coating with a solution containing a vinyl chloride-vinyl acetate copolymer resin (Kaneblax KM-1 of Kanegafuchi Chemical Co.) in methyl ethyl ketone. A CGL, 0.1μ in thickness, was formed on said subbing layer by coating with a solution containing a trisazo pigment No. 8, No. 28, No. 31, or No. 34 in n-butylamine. A CTL, 15μ in thickness, was formed on said CGL by coating with a solution containing 2 g of 2,5-bis(4′-diethylaminostyryl)-1,3,4-oxadiazole and 2 g of a polyester resin (Pyron-200 of Toyobo Co.) in 15 ml of 1,2-dichloroethane, and drying. There were thus obtained 4 electrophotographic photoreceptors of this invention. In a manner similar to that in Example 8, each of the four photoreceptors was tested for the maximum absorption wavelength in the visible-nearinfrared region and the energy required for the one-half decay of potential at the maximum absorption vavelength. The results obtained were as shown in Table 3. The initial potential $V_o$ was 600 ($-V$) in each case,

TABLE 3

| Example No. | Trisazo pigment No. | Max. absorption wavelength (nm) | One-half decay energy (erg/cm$^2$) |
|---|---|---|---|
| 9 | 8 | 765 | 3.2 |
| 10 | 28 | 745 | 4.5 |
| 11 | 31 | 750 | 3.5 |
| 12 | 34 | 755 | 4.8 |

EXAMPLE 13

An anodized aluminum sheet, which had been grained, was provided on the grained surface with a layer, 6μ in thickness, by coating with a pigment suspension containing a styrene-methyl methacrylate-methacrylic acid copolymer (styrene: methyl methacrylate =2:1 by weight; acid value 220), trisazo pigment No. 8, and N,N-dibenzylaminophenyl-1-methyl-1-phenylhydrazone in the ratio of 1.5:0.2:1.0 by weight in dioxane, and drying. There was thus obtained a photoreceptor of the single-layer type according to this invention. The photoreceptor was tested for the electrophotographic characteristics by means of the aforementioned electrostatic paper testing apparatus. The test results were as follows:

Applied voltage : +6 KV
$V_o$=470 (+V)
$E_{\frac{1}{2}}$=6.4 (lux·sec.)
$E_{50}$=1.6 (lux·sec.)

The exposed photoreceptor was developed with a toner to make the latent image visible and treated with an aqueous alkaline processing solution (e.g. an aqueous solution containing 3% of triethanolamine, 10% of ammonium carbonate and 10% of polyethylene glycol having an average molecular weight of 190-210) to dissolve the photosensitive layer in areas bearing no toner particles. The photoreceptor was then washed with an aqueous sodium silicate solution to obtain a printing plate. The printing plate was used in the offset printing test and found to endure the printing of about 100,000 copies. The optimum exposure for the development with toner was found to be 50 lux·sec (light source : halogen lamp). The printing plate was made by the direct process without using a block copy.

EXAMPLE 14

A conductive support of polyester film having an aluminum foil laminated thereon (Alpet 85 of Daidokako Co.; aluminum foil of 10μ in thickness) was provided with an intermediate layer, 0.05μ in thickness, comprising a vinyl chloride-vinyl acetate-maleic anhydride copolymer (Eslex MF 10 of Sekisui Kagaku Co.). A CGL, 0.5μ in thickness, was formed on said intermediate layer by coating with an azo compound dispersion prepared by treating 2 g of the bisazo pigment No. 4, 2 g of a polyarylate resin (U-100 of Unitika Co.) and 100 ml of 1,2-dichloroethane in a paint conditioner for about one hour and then drying. Then a CTL, 12μ in thickness, was formed on said CGL by coating with a solution containing 5 g of N,N-dibenzylaminobenzaldehyde-1,1-diphenylhydrazone, a charge carrier transport substance, and 7 g of a polyarylate resin in 50 ml of 1,2-dichloroethane, and drying. There was thus obtained an electrophotographic photoreceptor of this invention. The photoreceptor was kept in the dark place at 30° C. for 1 week and mounted on an electrostatic paper testing apparatus (SP-428 of Kawaguchi Denki Seisakusho Co.) to perform the following characteristics test.

The photoreceptor was charged by exposing for 5 seconds to corona discharge under application of a voltage of −6KV. The potential on the charged surface was $V_o(-V)$ (initial potential). The charged surface was then exposed to the light from a halogen lamp at an intensity of illumination of 30 lux on the surface of the photosensitive layer to determine the exposure $E_{\frac{1}{2}}$(lux·sec.) necessary for one-half decay of the initial potential. Furthermore, surface potential, i.e., residual potential $E_{50}(-V)$ of the photosensitive layer after exposure of 30 lux·second was measured. The above procedure was repeated 500 cycles to evaluate the characteristics in repeated use. Between each cycle of exposure to the halogen lamp, the residual potential on the surface was completely removed by exposing for 0.3 sec. to the light from a tungsten lamp at an intensity of illumination of 300 lux. The results of test were as shown in Table 4.

TABLE 4

| | 1st cycle | 500th cycle |
|---|---|---|
| $V_o$ (−V) | 870 | 840 |
| $E_{\frac{1}{2}}$ (lux · sec.) | 2.4 | 2.3 |
| $E_{50}$ (−V) | about 5 | 0 |

EXAMPLES 15 to 19

Five kinds of electrophotographic photoreceptor were prepared in the same manner as in Example 14, except that bisazo pigments Nos. 2, 13, 18, 24, and 50 were used in place of the bisazo pigment No. 4. Each photoreceptor was tested for the characteristics in the same manner as in Example 14. The results of test were as shown in Table 5.

TABLE 5

| Example No. | Bisazo pigment No. | First cycle | | | 500th cycle | | |
|---|---|---|---|---|---|---|---|
| | | $V_o$(−V) | $E_{\frac{1}{2}}$ (lux · sec.) | $E_{50}$(−V) | $V_o$(−V) | $E_{\frac{1}{2}}$ (lux · sec.) | $E_{50}$(−V) |
| 15 | 2 | 840 | 2.5 | ca. 5 | 820 | 2.5 | 0 |
| 16 | 13 | 830 | 2.2 | 0 | 800 | 2.1 | 0 |
| 17 | 18 | 850 | 2.9 | ca. 5 | 810 | 2.8 | 0 |
| 18 | 24 | 870 | 3.4 | ca. 10 | 830 | 3.4 | ca. 5 |
| 19 | 50 | 790 | 3.7 | ca. 10 | 770 | 3.5 | ca. 5 |

EXAMPLE 20

An aluminum drum, 80 mm in diameter was provided on the surface with an intermediate layer, 0.04μ in thickness, comprising a vinyl chloride-vinyl acetate (87:13) copolymer (VYHH of Union Carbide Co.). A CGL of 0.5μ in thickness was formed on said intermediate layer by coating with a dispersion prepared by treating 4 g of the bisazo pigment No. 13 and 400 ml of 1,2-dichloroethane in a paint conditioner for about 3 hours, and drying. A CTL, 15μ in thickness, was formed on said CGL by coating with a solution containing 10 g of N,N-diethylaminobenzaldehyde-1-phenyl-1-allylhydrazone, a charge carrier transport substance of the structural formula

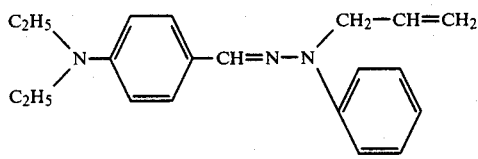

and 12 g of a polycarbonate resin (Panlite L-1250 of Teijin Ltd.) in 100 ml of 1,2-dichloroethane, and drying. There was thus obtained a drum-type electrophotographic photoreceptor according to this invention.

The photoreceptor was mounted, on a remodelled commercial electrophotographic copier of the cartridge type and an image was reproduced. The reproduced image showed a high contrast, satisfactory sharpness, and a high fidelity to the original. The copying was repeated 1,000 times. No significant difference was observed between the first copy and the last copy.

EXAMPLE 21

The reflection spectrum of the drum-type electrophotographic photoreceptor obtained in Example 20 was determined by means of a spectrophotometer (UV-365 of Shimadzu Seisakusho Ltd.) provided with an integrating sphere. The maximum absorption wavelength was found at about 640 nm. The spectral sensitivities at 630 nm and 640 nm were determined by means of a monochrometer. The energies required for the one-half decay of potential for both wavelengths were found to be about 3.5 erg/cm$^2$, indicating that the photoreceptor is usable even when gas laser beam is selected as light source.

EXAMPLES 22 to 26

A conductive support of polyester film vacuumplated with aluminum was provided with an intermediate layer, 0.05μ in thickness, comprising a vinyl chloridevinyl acetate copolymer (Kaneblax L-CP of Kanegafuchi Chemical Co.). A CGL, 0.1μ in thickness, was formed on said intermediate layer by coating with a solution containing a bisazo pigment No. (23), (30), (36), (47), or (53) in n-butylamine. A CTL, 14μ in thickness, was formed on said CGL by coating with a solution containing 5 g of 1-diethylaminophenyl-3-phenyl-5-styryl-pyrazoline and 5 g of a polyester resin (Pyron-200 of Toyobo Co.) in 40 ml of 1,2-dichloroethane, and drying. There were thus obtained 5 electrophotographic photoreceptors of this invention. In a manner similar to that in Example 21, each of the five photoreceptors was examined for the reflection absorption curve, the maximum absorption wavelength in the visible-near infrared region, and the energy required for the one-half decay of potential at the maximum absorption wavelength. The results obtained were as shown in Table 6. All of the five photoreceptors showed an initial potential, V$_o$, exceeding 700 (−V), the applied voltage being −6 KV.

TABLE 6

| Example No. | Bisazo pigment No. | Max. absorption wavelength (nm) | Half decay energy (erg/cm$^2$) |
|---|---|---|---|
| 22 | (23) | 660 | 4.2 |
| 23 | (30) | 625 | 3.5 |
| 24 | (36) | 615 | 4.5 |
| 25 | (47) | 620 | 5.1 |
| 26 | (53) | 635 | 3.8 |

EXAMPLE 27

An anodized aluminum sheet, which had been grained, was provided on the grained surface with a layer, 6μ in thickness, by coating with a pigment suspension containing a styrene-methyl methacrylate-methacrylic acid copolymer (acid value 185), bisazo pigment No. 35, and diethylaminobenzaldehyde-N-phenyl-N-4-ethylbenzylhydrazone in the ratio of 1.5:0.2:1.0 by weight in dioxane, are drying. There was thus obtained a photoreceptor of the single-layer type according to this invention. The photoreceptor was tested for the electrophotographic characteristics by means of the aforementioned electrostatic paper testing apparatus. The test results were as follows:

Applied voltage : +6 KV
V$_o$=420 (+V)
E½=6 (lux·sec.)

The exposed photoreceptor was developed with a toner to make the latent image visible and treated with an aqueous alkaline processing solution (e.g. an aqueous solution containing 3% of triethanolamine, 10% of ammonium carbonate and 20% of polyethylene glycol having an average molecular weight of 190–210) to dissolve the photosensitive layer in areas bearing no toner particles. The photoreceptor was then washed with an aqueous sodium silicate solution to obtain a printing plate. The printing plate was used in offset printing test and found to endure the printing of about 100,000 copies. The optimum exposure for the development with toner was found to be 50 lux · 1.5 sec. (light source was halogen lamp). The printing plate was made by the direct process without using a block copy.

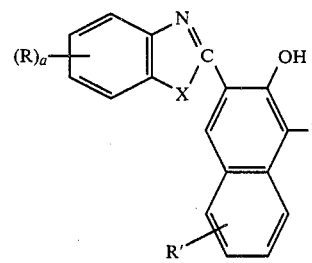 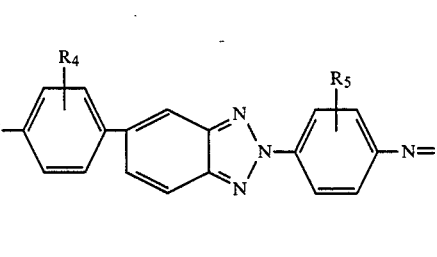 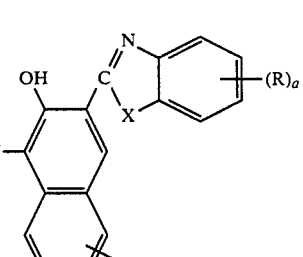

What is claimed is:

1. An electrophotographic photoreceptor comprising an electroconductive support and, provided thereon, a photosensitive layer containing (A) a trisazo pigment formed by the reaction between a coupler component represented by the following general formula (I) and a diazonium salt represented by the following general formula (II) or (B) a bisazo pigment represented by the following general formula (III):

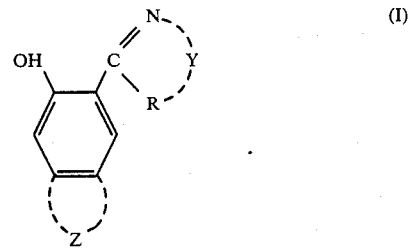

wherein Z is a substituted or unsubstituted hydrocarbon ring or a group of atoms necessary to complete a substituted or unsubstituted hetero ring, R is oxygen, sulfur, or —NR'—, Y is a chain hydrocarbon necessary to complete a 5- or 6-membered ring, and R' is hydrogen or an alkyl, benzyl, or aryl group which may have a substituent;

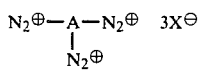 (II)

wherein A is a trivalent moiety whose carbon atom is bonded to nitrogen atom forming azo group and $X^\ominus$ is an anionic functional group;

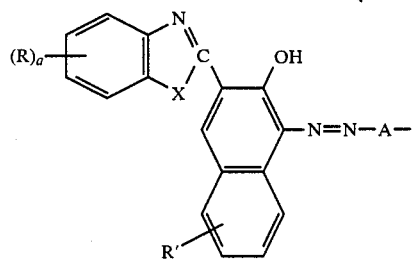 (III)

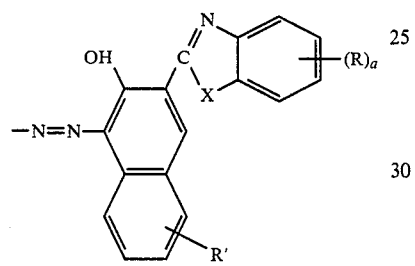

wherein A is a divalent moiety whose carbon atom is bonded to nitrogen atom forming azo group, R's which may be the same or different are each hydrogen, methyl, ethyl, nitro, or halogen, R' is hydrogen or halogen, X is —O—, —S—, or —NH—, and a is an integer of 1 or 2.

2. An electrophotographic photoreceptor according to claim 1, wherein the coupler component represented by the general formula (I) is a coupler represented by the following structural formula

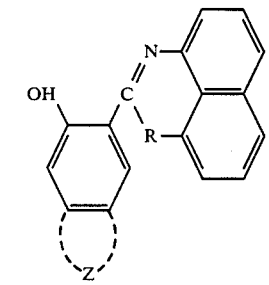

wherein R" is hydrogen, alkyl, nitro, alkoxy, halogen, or cyano and Z and R are the same as in general formula (I).

3. An electrophotographic photoreceptor according to claim 1, wherein the coupler component represented by the general formula (I) is a coupler represented by the following structural formula wherein Z and R are the same as in general formula (I).

4. An electrophotographic photoreceptor according to claim 1, wherein the bisazo pigment represented by the general formula (III) is a compound represented by the following structural formula

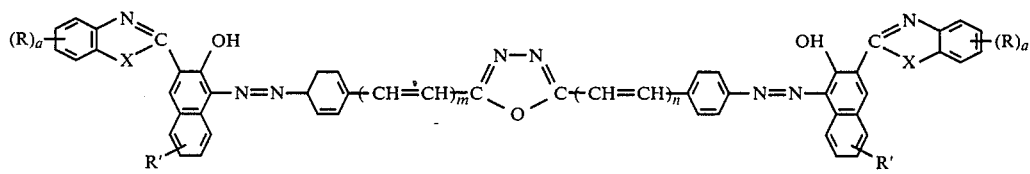

wherein m and n are each 0 or 1 and X, R, R' and a are as defined in claim 1.

5. An electrophotographic photoreceptor according to claim 1, wherein the bisazo pigment represented by the general formula (III) is a compound represented by the following structural formula

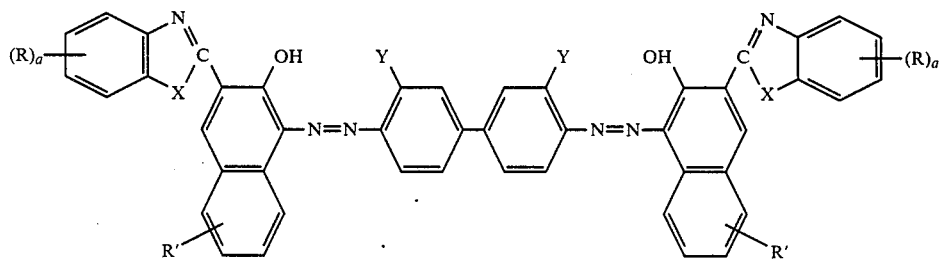

wherein Y is hydrogen, halogen, nitro, lower alkoxy, or lower alkyl and X, R, R' and a are as defined in claim 1.

6. An electrophotographic photoreceptor according to claim 1, wherein the bisazo pigment represented by the general formula (III) is a compound represented by the following structural formula

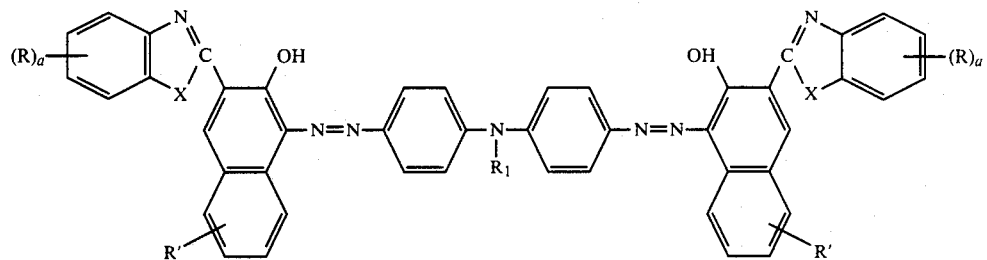

the general formula (III) is a compound represented by the following structural formula

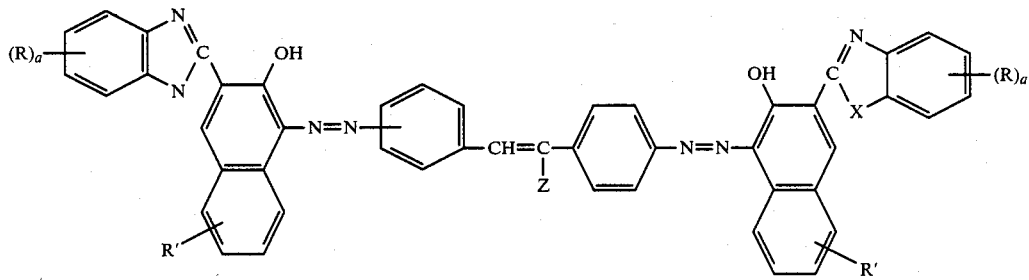

wherein Z is hydrogen, halogen or cyano and X, R, R' and a are as defined in claim 1.

7. An electrophotographic photoreceptor according to claim 1, wherein the bisazo pigment represented by the general formula (III) is a compound represented by the following structural formula

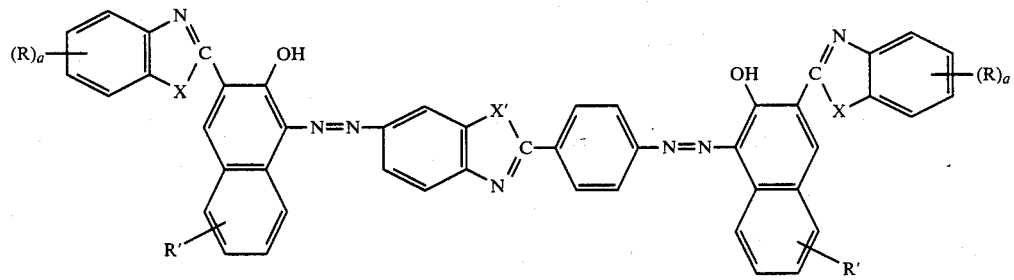

wherein X' is —O—, —S—, or —NH— and X, R, R' and a are as defined in claim 1.

8. An electrophotographic photoreceptor according to claim 1, wherein the bisazo pigment represented by the general formula (III) is a compound represented by the following structural formula wherein $R_1$ is hydrogen, alkyl, allyl, propenyl, benzyl which may have a substituent, or phenyl which may have a substituent and X, R, R' and a are as defined in claim 1.

9. An electrophotographic photoreceptor according to claim 1, wherein the bisazo pigment represented by the general formula (III) is a compound represented by the following structural formula

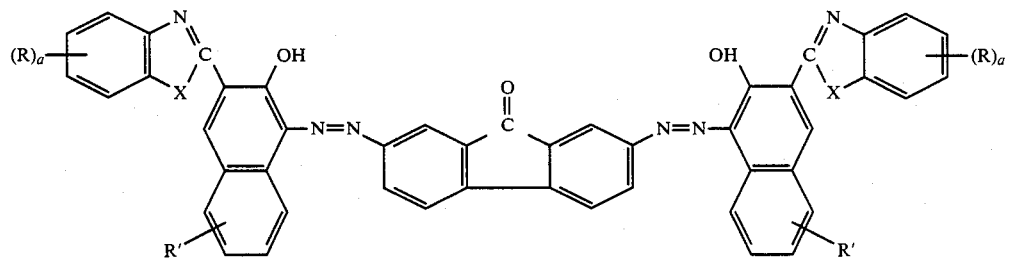

wherein X, R, R' and a are as defined in claim 1.

10. An electrophotographic photoreceptor according to claim 1, wherein the bisazo pigment represented by the general formula (III) is a compound represented by the following structural formula

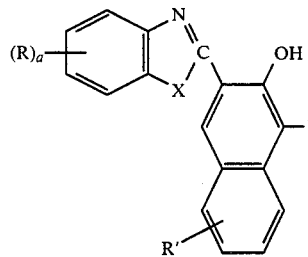 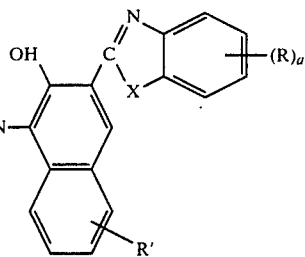

wherein $R_2$ is hydrogen, alkyl, allyl, propargyl, or benzyl which may have a substituent and X, R, R' and a are as defined in claim 1.

11. An electrophotographic photoreceptor according to claim 1, wherein the bisazo pigment represented by the general formula (III) is a compound represented by the following structural formula

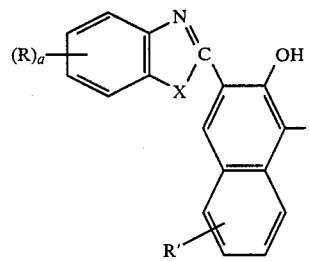

wherein $R_3$ is hydrogen, alkyl, allyl, propargyl, or benzyl which may have a substituent and X, R, R' and a are as defined in claim 1.

12. An electrophotographic photoreceptor according to claim 1, wherein the bisazo pigment represented by the general formula (III) is a compound represented by the following structural formula wherein $R_4$ and $R_5$ are each hydrogen, halogen, alkyl, methoxy, or nitro and X, R, R' and a are as defined in claim 1.

13. An electrophotographic photoreceptor according to claim 1, wherein the photosensitive layer contains a charge carrier transport substance and a charge carrier generation substance and said charge carrier generation substance is the trisazo pigment of the bisazo pigment.

14. An electrophotographic photoreceptor according to claim 1, wherein the photosensitive layer is a charge carrier generation layer and a charge carrier transport layer is provided thereon.

15. An image formation process which utilizes and electrophotographic photoreceptor according to claim 1.

* * * * *